(12) United States Patent
Horiuchi et al.

(10) Patent No.: US 6,712,864 B2
(45) Date of Patent: Mar. 30, 2004

(54) CARBON NANOTUBE STRUCTURES AND METHOD FOR MANUFACTURING THE SAME

(75) Inventors: Kazunaga Horiuchi, Minamiashigara (JP); Hisae Yoshizawa, Minamiashigara (JP); Masaaki Shimizu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 95 days.

(21) Appl. No.: 10/014,556

(22) Filed: Dec. 14, 2001

(65) Prior Publication Data

US 2002/0122765 A1 Sep. 5, 2002

(30) Foreign Application Priority Data

Mar. 2, 2001 (JP) ........................................ 2001-059055

(51) Int. Cl.$^7$ .................................................. D01F 9/12
(52) U.S. Cl. ...................... 23/314; 423/447.1; 156/73.2; 264/109; 427/189
(58) Field of Search .................... 423/447.1; 156/73.2; 427/122, 189, 207.1, 215, 372.2; 264/109, 122, DIG. 75, DIG. 76; 23/314

(56) References Cited

FOREIGN PATENT DOCUMENTS

WO    WO 89/07163    8/1989

OTHER PUBLICATIONS de Heer et al., "A Carbon Nanotube Field–Emission Electron Source", Science, vol. 270, Nov. 17, 1995, pp. 1179–1180.
de Heer et al., "Aligned Carbon Nanotube Films: Production and Optical and Electronic Properties", Science, vol. 268, May 12, 1995, pp. 845–847.
Rinzler et al., "Unraveling Nanotubes: Field Emission from an Atomic Wire", Science, vol. 269, Sep. 15, 1995, pp. 1550–1553.
Dai et al., "Nanotubes as nanoprobes in scanning probe microscopy", Nature, vol. 384, Nov. 14, 1996, pp. 147–150.
Dillon et al., "Storage of hydrogen in single–walled carbon nanotubes", Nature, vol. 386, Mar. 27, 1997, pp. 377–379.
Dai et al., "Single–wall nanotubes produced by metal–catalyzed disproportionation of carbon monoxide", Chemical Physics Letters, vol. 260, Sep. 27, 1996, pp. 471–475.
Iijima, "Helical microtubles of graphitic carbon", Nature, vol. 354, Nov. 7, 1991, pp. 56–58.
Ebbesen et al., "Large–scale synthesis of carbon nanotubes", Nature, vol. 358, Jul. 16, 1992, pp. 220–222.
Guo et al., "Catalytic growth of single–walled nanotubes by laser vaporization", Chemical Physics Letters, vol. 243, Sep. 8, 1995, pp. 49–54.
Thess et al., "Crystalline Ropes of Metallic Carbon Nanotubes", Science, vol. 273, Jul. 26, 1996, pp. 483–487.
Bachtold et al., "Aharonov–Bohm oscillations in carbon nanotubes", Nature, vol. 397, Feb. 25, 1999, pp. 673–675.

*Primary Examiner*—Stuart L. Hendrickson
(74) *Attorney, Agent, or Firm*—Oliff & Berridge, PLC

(57) ABSTRACT

Carbon nanotube structures which enhances handling of carbon nanotubes, enabling them to be applied in a wide variety fields such as electronic devices, functional materials, and structural materials containing carbon nanotubes, and a method for producing them are provided. A method for manufacturing carbon nanotube structures includes the step of forming liquid bridges of a liquid at gaps among plural objects and/or at plural gaps among portions of an object. The plural carbon nanotubes are dispersed in the liquid and linked together, then arranged structurally to the liquid bridges, and the carbon nanotube structures are manufactured in this way.

17 Claims, 14 Drawing Sheets

CARBON NANOTUBE STRUCTURES AND METHOD FOR MANUFACTURING THE SAME

BACKGROUND OF THE INVENTION

1. Field of the Invention

This invention relates to carbon nanotube structures available to devices and functional materials containing carbon nanotubes and their manufacturing method.

The invention can be extended to a wide variety of applications of carbon nanotubes.

2. Description of the Related Art

Fibrous carbons are generally called carbon fibers and conventionally, several kinds of methods for manufacturing carbon fibers having thickness of several $\mu$m or more in diameter used for structural materials have been studied. At present, among them, the method for manufacturing the carbon fibers from PAN-based (polyacrylonitrile) and pitch-based materials is most widely used.

The method is briefly described as such a method, by which materials spun out from the PAN-based, isotropic pitch-based, and meso-phase pitch-based fibers are insolubilized, made flameproof, carbonized at 800 to 1400° C., and high-temperature treated at 1500 to 3000° C. Since the resulting carbon fibers not only have superior mechanical characteristics such as strength and elastic modulus but also are lightweight, they are used for sporting goods, a heat-insulating material, a compound material for a structural material applicable to aerospace and automobile production.

Apart from this, the carbon nanotubes discovered recently are made of a tubular material with a thickness of 1 $\mu$m smaller (in diameter). Ideally, a carbon face of a hexagon mesh forms a tube in parallel to an axis of the tube and multiple tubes may be formed. It may be theoretically estimated that the carbon nanotubes have either metallic or semiconductor property depending on how carbon hexagon meshes are linked and the thickness of the tubes, allowing expectation that it will be a promising functional material.

Usually, to synthesize the carbon nanotubes, an arc discharge method is used and in addition, the methods including a laser evaporation method, a pyrolytic method, and a method using plasma have recently been studied. The carbon nanotubes recently developed are generally described below.

Carbon Nanotube

Finer than carbon fibers, the material with 1 $\mu$m or smaller of diameter is generally called a carbon nanotube and distinguished from the carbon fiber, although no clear line can be run between both the types of carbon fibers. By a narrow definition, the material, of which carbon faces with hexagon meshes are almost parallel to the axis of the tube, is called a carbon nanotube and even a variant of the carbon nanotube, around which amorphous carbon and metal catalyst surrounds, is included in the carbon nanotube. (Note that with respect to the present invention, this narrow definition is applied to the carbon nanotube.)

Usually, the narrowly-defined carbon nanotubes are further classified into two types: the carbon nanotubes having a structure with a single hexagon mesh tube are called a single wall nanotube (hereafter, simply referred to as "SWNT"; the carbon nanotube made of multi-layer hexagon mesh tubes is called a multi-wall nanotube (hereafter, simply referred to as "MWNT"). What type of carbon nanotubes are produced may be determined depending on how to synthe- size and the established conditions to some degree but production of only the carbon nanotubes with an identical structure has not yet been achieved.

The carbon fibers have larger diameters and incomplete cylindrical mesh structures parallel to the axes of the tubes. The carbon nanotubes produced by a vapor-phase pyrolysis method using a catalyst have a tubular mesh structure parallel to the axis of the tube in the vicinity of a center of the tube and in many cases, a large mount of carbon having a disordered structure surrounds it.

Application of Carbon Nanotube

Next, the applications of carbon nanotubes are described below.

At present, no carbon nanotube-applied products have been yet put on the market but research and development activities are actively taken. Among of them, some typical examples are briefly described below.

(1) Electron Source

Since carbon nanotubes have sharp ends and electric conduction, in many studies, they have been treated as electron sources. It has been reported by W. A. deHeer et al., Science, Vol. 270?01995?9p1179 that the carbon nanotubes produced by the arc discharge method can be set on a board through a filter after purification to use as electron sources. This report describes that a collection of carbon nanotubes is used for electron sources and 100 mA or higher emission current is stably gained from a 1 cm$^2$ area by applying 700 V of voltage.

Moreover, A. G. Rinzler et al. has reported in Science, Vol. 269, 1995, p1550, that, by attaching a carbon nanotube produced by the arc discharge method to an electrode and evaluating its characteristics, it is proved that from a carbon nanotube, whose ends are closed, about 1 nA emission current and from a carbon nanotube, of whose ends were open, about 0.5 $\mu$A emission current are gained respectively when voltage of 75 V is applied.

(2) STM, AFM

The applications of carbon nanotubes to STM and AFM have been reported by H. Dai et al., Nature, 384, 1996, p.147. The carbon nanotubes used in this study are produced by the arc discharge method, whose ends are 5 nm-diameter SWNTs. It is said that since their tips are thin and flexible, they could be observed even at bottoms of gaps of a sample and become ideal tips that cannot be crashed at their ends.

(3) Hydrogen Storage Material

It has been reported by A. C. Dillon et al., Nature, Vol. 386, 1997, p377 to 397 that the carbon nanotubes using SWNTs can store hydrogen molecules several times those for the carbon nanotubes made of a pitch-based material. Although a study about the applications has just been begun, they are expected to be a promising material for hydrogen storage, for example, for hydrogen-fueled cars in the future.

At present, three types of methods are mainly used for manufacturing the carbon nanotubes mentioned above. To be concrete, the methods include a method (the pyrolysis method using the catalyst) similar to the vapor-phase epitaxy method for manufacturing the carbon fibers, the arc discharge method, and the laser evaporation method. In addition to the three types of methods mentioned above, a plasma synthesis method and a solid reaction method are known.

Here, these typical three methods are briefly described below.

(1) The Pyrolysis Method Using the Catalyst

The method is almost the same as the vapor-phase epitaxy method for manufacturing the carbon fibers. The details of such a method have been described by C. E. SYNDER et al., International Patent WO89/07163 (International Publication Number). It is indicated that ethylene and propane are introduced mixed with hydrogen as a material gas, as well as metal fine particles into a reaction vessel in their study and in addition to them, saturated hydrocarbon such as methane, ethane, propane, butane, hexane, and cyclohexane and oxygen such as acetone, methanol, and carbon monoxide may be used for the material gas.

Furthermore, it has been suggested that a preferable ratio of material gas and hydrogen is 1:20 to 20:1, Fe or a mixture of Fe and Mo, Cr, Ce, or Mn are recommended as catalysts, and a method has been proposed, by which the catalyst was kept adhesive on a fumed alumina layer, as well. It is preferable that with regard to the reaction vessel, flow rates of the gas with hydrogen and the material gas with carbon are set to 100 sccm/inch and 200 sccm/inch, respectively at a temperature in a range of 550 to 850° C. and in this case, about 30 minutes to one hour after fine particles are introduced, the carbon nanotubes begin to grow.

With respect to a shape of the resultant carbon nanotube, its diameter is about 3.5 to 75 nm and length is 5 to 1000 times the diameter. A mesh structure of carbon is parallel to an axis of the tube with less pyrolytic carbon adhered to an outer wall of the tube.

It has been reported by H. Dai et al., Chemical Physics Letters, 260, 1996, p.471 to 475 that regardless of low efficiency of production, Mo is used as a catalytic nucleus and the material gas of carbon monoxide reacts at 1200° C., allowing SWNT to be produced.

(2) The Arc Discharge Method

The arc discharge method, which was first discovered by Iijima, is described in detail in Nature, Vol. 354, 1991, p 56 to 58. The arc discharge method is a simple method, by which direct current arc discharge is performed using carbon electrode rods in an atmosphere containing argon under about 13300 Pa (100 Torr). The carbon nanotubes grow with 5 to 20 nm of carbon particles in partial area on a surface of a negative electrode. The resultant carbon nanotubes have a layer structure, in which tubular carbon meshes with 4 to 30 nm of diameter and about 1 to 50 $\mu$m of length are overlapped; the mesh structure of carbon being helically formed in parallel with its axis.

Helical pitches depend on tubes or layers in the tube and for multi-layer tubes, a distance between the layers is 0.34 nm, which is almost identical to a distance between graphite layers. The open ends of the tubes are also covered with a carbon network.

Moreover, T. W. Ebbesen et al. reported a condition, in which a large amount of carbon nanotubes is produced by the arc discharge method in "Nature" (Vol. 358, 1992, p220 to 222). To be concrete, arc discharge of about 18V and 100 A is generated in the condition, in which a 9 mm-diameter carbon rod for a cathode and a 6 mm-diameter carbon rod for an anode are used, respectively, which were oppositely disposed 1 mm apart from one another in a chamber, in the atmosphere containing helium under about 66500 Pa (500 Torr).

If a pressure lower than 66500 Pa (500 Torr) is applied, a less amount of carbon nanotubes are produced, while even if the pressure higher than 66500 Pa (500 Torr) is applied, the total amount of carbon nanotubes to be produced is small. In the optimal condition of 66500 Pa (500 Torr), a percentage of carbon nanotubes in a product reaches 75%. When an input power is varied or argon is contained in the atmosphere instead of helium, a yield of carbon nanotubes would become lower. Note that the carbon nanotubes are prone to gather in the vicinity of centers of the carbon rods.

(3) The Laser Evaporation Method

The laser evaporation method was reported by T. Guo et al. in "Chemical Physics Letters" (243, 1995, p. 49 to 54) and A. Thess et al. reported in "Science" (vol. 273, 1996, p. 483 to 487) that lope-like SWNTs were produced by the laser evaporation method. The method is generally described below.

After the carbon rods, of which surfaces Co and Ni are dispersed on, are put into a quartz tube and Ar (argon) is filled in the quartz tube under 66500 Pa (500 Torr), a whole tube is heated to about 1200° C. From an upstream end of the quartz tube, NdYAG laser is focused on the carbon rods to heat for evaporate. Then, on a downstream side of the quartz tube, carbon nanotubes are deposited. The method is a promising method for producing SWNTs selectively and has its own characteristics, for example, SWNTs are prone to gather into a lope-like shape.

In the conventional carbon nanotube structures and manufacturing methods mentioned above, either thickness or a growing direction of the resulting carbon nanotubes vary widely and immediately after they have been produced, the electrodes have not yet jointed the carbon nanotubes. This means that before the carbon nanotubes can be used, after synthesis, they must have been collected, purified, and formed into specific shapes depending on individual applications.

For example, since when an attempt is made to apply the carbon nanotubes to electric circuits, not only is it difficult to handle the carbon nanotubes because of their very fine sizes but also no method has been yet proposed for producing high-density wirings such as integrated circuits (ICs), the only thing subject to evaluation is a single-structure fine element, which was produced by preparing fine electrodes, on which the carbon nanotubes are grown. See, for example, Nature, vol. 397, 1999, p. 673–675. In addition, it is preferable to build the carbon nanotubes in circuits effectively with no loss because they are very expensive.

The problems of difficult handling and expensiveness are large obstacles to actual application to devices.

As one of breakthroughs, electric signal processing simulating a mechanism of an organismic brain, which is different from those of conditional electronic circuit devices, may be considered. Unlike conditional electric wirings, the carbon nanotubes provide multi-wirings as if they were neurons in brain, possibly allowing a non-Neumann type of processing mechanism, which is different from that of conventional computation to be implemented. Nevertheless, it has not yet been reported that a structure of carbon nanotube fibers was used to transmit and process signals.

Furthermore, A. G. Rinzler et al. has reported that when an attempt is made to use the carbon nanotubes for electron sources, as shown in "Science" (Vol. 269, 1995, p. 1550 to 1553), it is required that one of the carbon fibers is taken out and its one end is attached to the electrode. In addition, Walt A. de Heer et al. has reported that as shown in "Science" (Vol. 270, 1995, p. 1179 to 1180) and "Science" (Vol. 268, 1995, p. 845 to 847), after the carbon nanotubes produced by the arc discharge method are purified, a process, in which they are stuck up on a board using a ceramic filter, is required. In this case, the electrodes and the carbon nanotubes are not firmly united. Moreover, since the used carbon nanotubes are prone to intertangle each other, individual characteristics of the carbon nanotubes are not put in good use in the electron source device.

SUMMARY OF THE INVENTION

The invention is designed to overcome the problems mentioned above and to provide the carbon nanotube structures, which allow the carbon nanotubes to be widely applied to electronic devices and functional materials containing them, as well as other structural materials by improving handling properties, and a method for manufacturing them.

The purpose mentioned above is attained by the present invention described below.

The invention is a method for manufacturing carbon nanotube structures including the step of forming liquid bridges of a liquid at gaps among plural objects and/or at plural gaps among portions of an object. The multiple carbon nanotubes are dispersed in the liquid and linked together, then arranged structurally to the liquid bridges.

Carbon nanotube structures, in which multiple carbon nanotubes link together, are structured and arranged along shapes of the liquid bridges formed among the multiple objects and/or among the multiple portions of an object.

BRIEF DESCRIPTION OF THE DRAWINGS

Preferred embodiments of the present invention will be described in detail based on the followings, wherein:

FIG. 9A illustrating a first condition, in which a little amount of liquid forms the liquid bridges and FIG. 9B illustrating a second condition, in which a large amount of liquid forms the liquid bridges, respectively;

FIG. 10A illustrating a first condition, in which a little amount of liquid forms the liquid bridges and FIG. 10B illustrating a second condition, in which a large amount of liquid forms the liquid bridges, respectively;

PREFERRED EMBODIMENTS OF THE INVENTION

Hereunder, the invention is described in detail.
Operation Mechanism of the Invention First of all, the operation mechanism of the present invention will be described below.

In the invention, the liquid bridges are formed at the gaps among the multiple objects each other and/or at the gaps among the multiple portions of the object. The liquid bridges generally called "meniscus" indicate a phenomenon, in which provided that the gaps formed among the multiple objects each other or the gaps formed among the multiple portions of the object (hereafter, in some cases, they may be simply referred to as "the gaps among the objects each other") are sufficiently small and the gaps are covered with a certain amount of liquid, a interaction between the cohesion of the liquid and the adherence between the liquid and the objects makes the liquid levels at the points in contact with the objects higher while those at the mid points between them lower, forming concave portions, which are curved liquid surfaces made at the gaps among the objects each other by the liquid's surface tension. The capillary phenomenon is similar to the phenomenon mentioned above and the "liquid bridges" of the invention include the conditions of the liquid formed at the gaps among the object each other and the like by the capillary phenomenon with no distinction.

Figure 1:
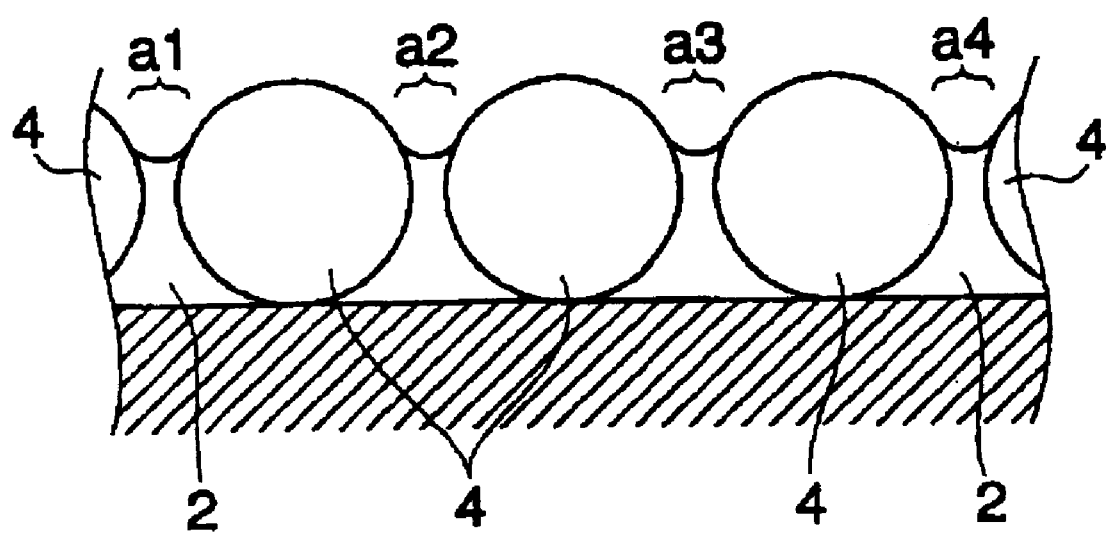
FIG. 1 is an expanded schematic sectional view showing a condition, in which spherical particles as multiple objects and liquid show liquid bridges.

By closing the multiple objects each other to form the gaps and filling them with the liquid, the liquid bridges mentioned above are formed. FIG. 1 is a expanded schematic sectional view showing a condition, in which spherical objects are used as multiple objects and the liquid bridges are formed by the spherical particles and the liquid. As shown in FIG. 1, by forming the sufficiently small gaps among particles 4 and filling them with the liquid 2, the liquid bridges a1 to a4, at which liquid levels are concave-shaped by a bridging power of liquid, are formed at the gaps among the particles 4. It is a characteristic of the invention that by gathering the multiple nanotubes at the liquid bridges a1 to a4, the carbon nanotubes are linked together, structured and arranged.

An operation of the invention will be concretely described based on the accompanying drawings. FIG. 2 is an expanded schematic sectional view explaining the operation of the invention on a time series basis. Although the carbon nanotubes 8 have a slender tubular shape, in FIG. 2, the carbon nanotubes 8 are drawn as circles because of their cross sections.

Figure 2A:
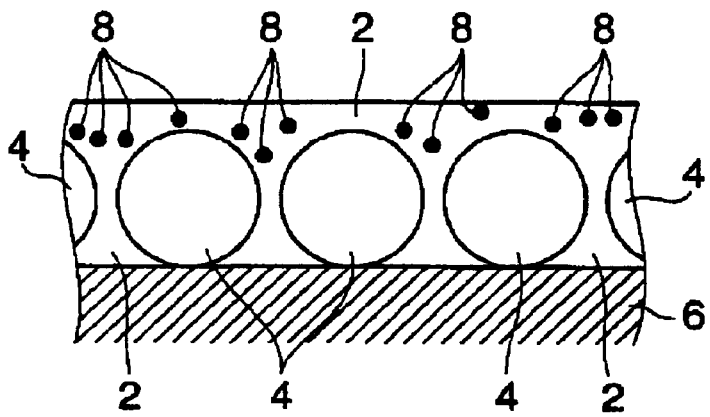
FIG. 2A, FIG. 2B, FIG. 2C, and FIG. 2D are expanded schematic sectional views explaining an operation of the present invention on a time series basis, FIG. 2A showing a condition, in which the particles are fixed on a surface of a board and covered with the liquid having carbon nanotubes dispersed, FIG. 2B showing a condition, in which from the liquid level of the liquid illustrated in FIG. 2A until it reached top levels of the particles, the liquid has been evaporated, FIG. 2C showing a condition, in which the liquid has been further evaporated to form the liquid bridges at gaps between the particles, and FIG. 2D showing a condition, in which from the liquid level of the liquid illustrated in FIG. 2C, the liquid has been further evaporated to make the carbon nanotubes linked together to achieve structured arrangements.

First, it is supposed that as shown in FIG. 2A, the particles 4 are fixed on a board 6 and the particles 4 are covered with the liquid with the carbon nanotubes 8 dispersed.

Figure 2B:
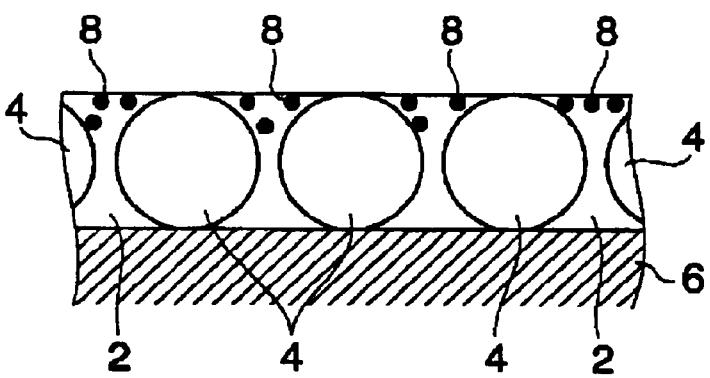
Figure 2C:
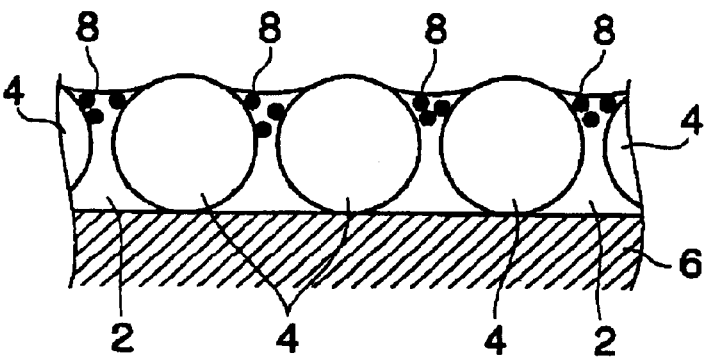

FIG. 2B shows a condition, in which from liquid levels illustrated in FIG. 2A until the liquid levels of the liquid 2 reached the levels of particles 4, the liquid 2 was evaporated. By further evaporating the liquid 2, as shown in FIG. 2C, the liquid bridges a1 to a4 are formed at the gaps among the particles 4 each other. At this time, the carbon nanotubes 8 behave as if they were attracted to the liquid bridges a1 to a4. From this point, by further evaporating the liquid 2, as shown in FIG. 2D, the carbon nanotubes 8 are met, structured, and arranged at the liquid bridges a1 to a4.

Figure 2D:
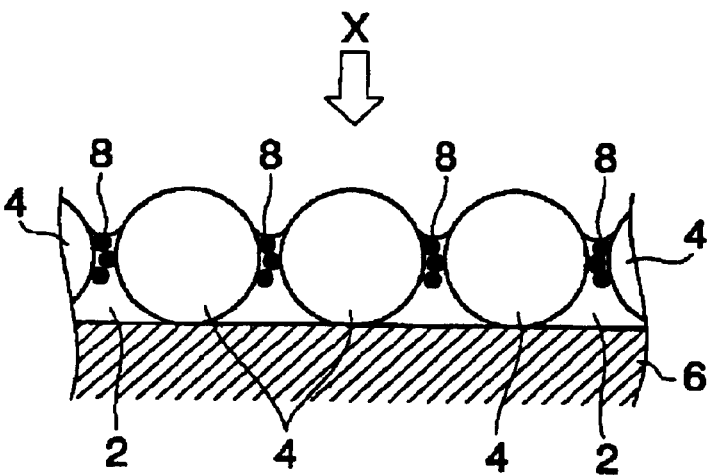
Figure 3:
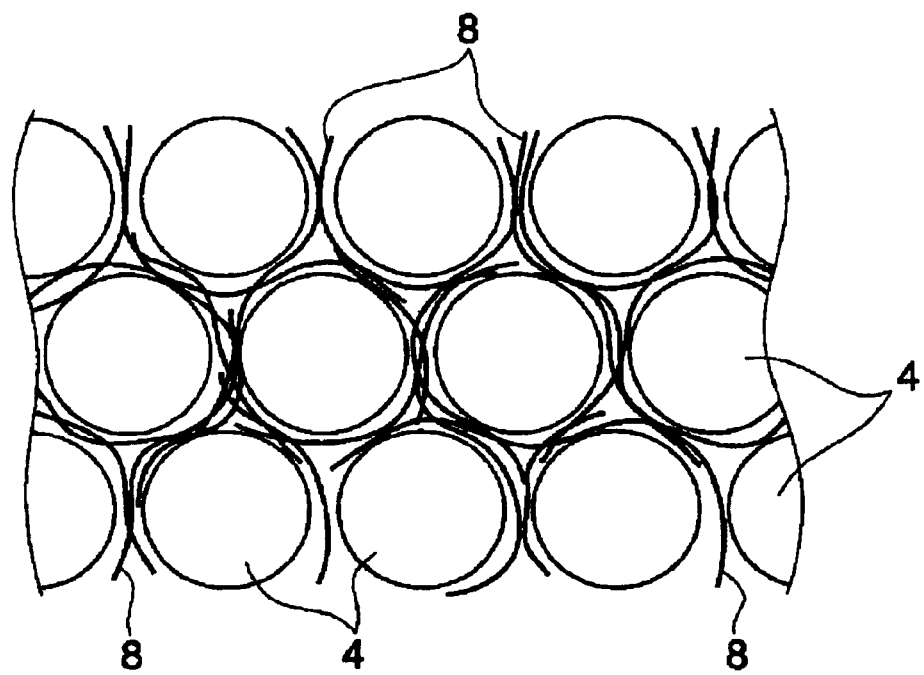
FIG. 3 is an expanded schematic plan view showing a condition illustrated in FIG. 2D, in which the carbon nanotubes link at the liquid bridges to achieve the structured arrangements.
Figure 4:
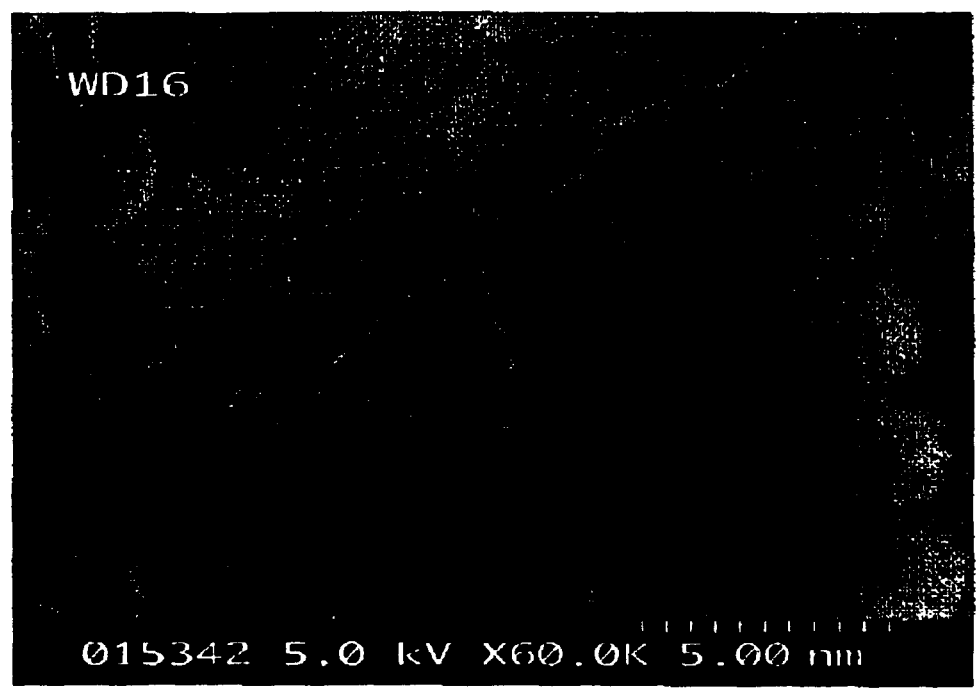
FIG. 4 is an enlarged electron microscopic picture showing an example of the carbon nanotube structures of the present invention.

FIG. 3 is a plan view (a view observed from a side of an arrow X in FIG. 2D) showing the condition illustrated in FIG. 2D. As known from the figure, the multiple carbon nanotubes 8 are met, structured, and arranged. FIG. 4 is an enlarged electronic microscopic picture showing the carbon nanotube structures produced in this way. In FIG. 4, spherical objects are latex particles used as the multiple objects and white lines running through the gaps among the particles are the carbon nanotubes.

Thus, according to the invention, using the liquid bridges, the carbon nanotubes can be structured and arranged, allowing easy manufacturing of the carbon nanotube structures. This means that by filling the liquid bridges with the liquid containing the carbon nanotubes, the carbon nanotubes are linked at the liquid bridges and the density of the carbon nanotubes becomes higher, which allows the carbon nanotubes to be easily and correctly structured. Moreover, by adjusting the kind, shape, size, the density of multiple objects used for forming the liquid bridges and the width of the gaps among the objects and the like, the formation of the carbon nanotube structures can be correctly controlled.

Note that in the invention, with respect to the widths of the gaps referred to as "the gaps among the multiple objects (or the multiple fine particles) each other" or "the gaps at the multiple portions of an object", any widths, which allow the liquid bridges to be formed, are allowed with no problem. For example, if the surface tension of the liquid used for forming the liquid bridges is higher or, as mentioned later, if the density of the carbon nanotubes in the liquid is higher, the gaps may be widen. Furthermore, in the invention, it is not always meant that a certain width of gaps must be formed among the "multiple objects (or the multiple fine particles) each other", or the "multiple portions of the object" and for example, even if the adjacent objects or portions mentioned above are in full contact with one another at some points, the relationship between them can be treated as the gaps being shared by them provided that the liquid bridges can be formed in the vicinity of them.

Moreover, in the invention, with respect to the gaps referred to as the "gaps at the multiple portions of the object", the gaps may be included in the concept, provided that all the given gaps among the multiple portions of the object, at which the liquid bridges can be formed, are included, specifically, the given gaps, at which the liquid bridges can be physically formed at the "multiple portions of the object", as well as the gaps, at which provided that the surface condition of the object have been adjusted, the liquid bridges can be formed among the portions of the object, may be included in the concept of the "gaps at the multiple portions of the object".

The adjustment of the surface condition means that the surface condition is adjusted to create the portions with a lower affinity to the liquid (in the case of the liquid being water, the hydrophobic sites) and the sites with a higher affinity to the liquid (in the case of the liquid being water, the hydrophilic sites) on the surface of the object, wherein provided that the multiple sites with a higher affinity to the liquid surround the site with a lower affinity and the gaps among the multiple sites with a higher affinity to the liquid are sufficiently small, the liquid bridges are formed at the gaps. In the other words, in the invention, the liquid bridges, at which the carbon nanotubes link, are not always formed at the physical gaps among the objects or among the portions of the object.

The adjustment of the surface condition can be achieved, for example, by forming a molecular film on the surface of the object. The methods for forming a molecular film include concretely the Langmuir-Blodgett (LB) method and the method using a surface modification agent such as the Silane-coupling method.

Control Over the Carbon Nanotube Structures

According to the method of the invention for manufacturing the carbon nanotube structures, the formation of the carbon nanotube structures can be correctly controlled and the concrete method will be described below.

The Density of the Carbon Nanotubes in the Liquid

If multiple fine particles are used as the multiple objects as mentioned above, by evaporating a certain amount of the liquid from the liquid with the multiple carbon nanotubes dispersed, which covers the multiple fine particles, to form and arrange the gaps among the multiple fine particles resulting in the liquid bridges, at which the multiple carbon nanotubes link, the carbon nanotube structures are formed. Alternately, whether the multiple objects are the fine particles or not, by arranging fixedly the fine particles with fine gaps among them left, which are filled with the liquid with the carbon nanotubes dispersed (for example, by filling the places, in which the multiple objects having the fine gaps among them, with the liquid with the carbon nanotubes dispersed and by evaporating a certain amount of the liquid), the carbon nanotube structures can be formed.

In any of the examples mentioned above, since the carbon nanotubes in the liquid are equally distributed among the liquid bridges, the total amount of the carbon nanotubes in the liquid is equal to the sum of the carbon nanotubes linking at the liquid bridges. This means that the adjustment of the density of the carbon nanotubes in the liquid allows the amount of the carbon nanotubes, which gather at the liquid bridges, to be controlled.

In the other words, when the amount of the carbon nanotubes in the liquid is made smaller (its density decreases), the amount of the carbon nanotubes, which gather and are linked together and structured at the liquid bridges, also decreases, while when the amount of the carbon nanotubes in the liquid is made larger (its density increases), the amount of the carbon nanotubes, which gather and are linked together and structured at the liquid bridges, also increases. Thus, according to the invention, by adjusting the density of the carbon nanotubes in the liquid, the formation of the resulting carbon nanotube structures is correctly controlled.

Figure 5:
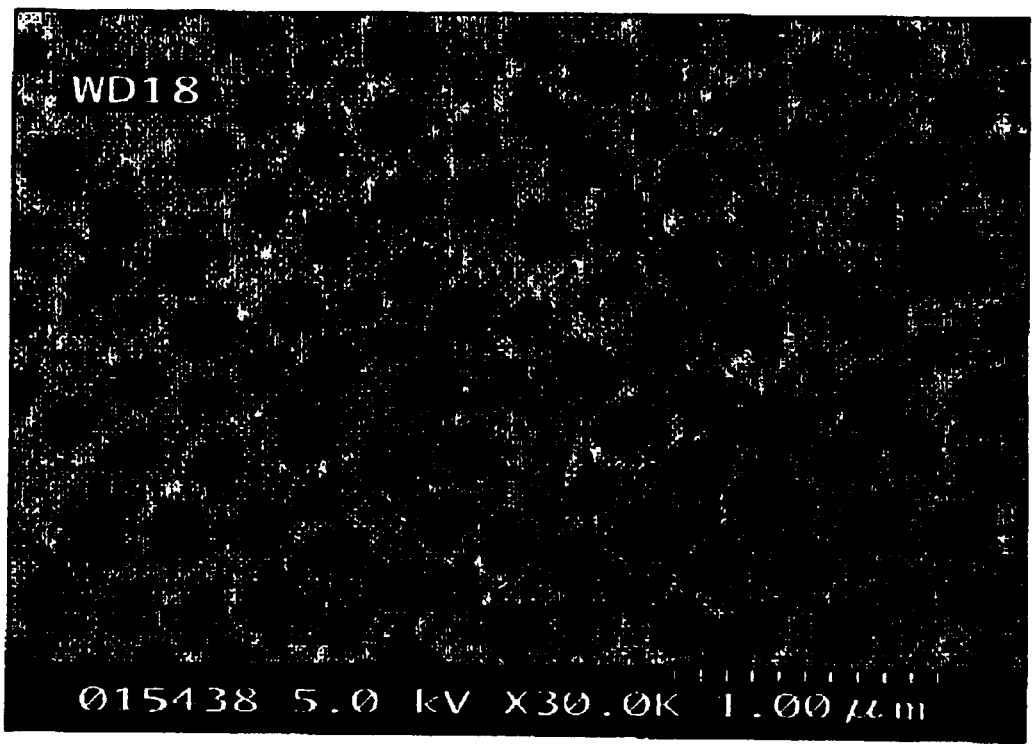
FIG. 5 is an enlarged electron microscopic picture showing a different example of the carbon nanotube structures of the present invention.

With respect to the carbon nanotube structures shown in FIG. 4, since the amount of the carbon nanotubes in the liquid for forming the carbon nanotube structures was relatively small, the amount of the carbon nanotubes also became small in the carbon nanotube structures. FIG. 5 is an enlarged electronic microscopic picture showing the carbon nanotube structures manufactured with a considerable amount of carbon nanotubes contained in the liquid. In the enlarged electronic microscopic picture shown in FIG. 5, a large amount of carbon nanotubes are arranged among the particles each other, closely forming the carbon nanotube structures, so on the picture, the individual carbon nanotubes cannot be identified.

Closest Packing of the Multiple Fine Particles

If the multiple fine particles are used as the multiple objects, by evaporating a certain amount of the liquid from the liquid with the multiple carbon nanotubes dispersed, which covers the multiple fine particles, the carbon nanotubes are arranged with the gaps among them left, the liquid bridges are formed, and the multiple carbon nanotubes link at the liquid bridges to achieve the carbon nanotube structures.

In the process of evaporating the liquid, the multiple fine particles are arranged with the gaps among them left and by further evaporating the liquid, the gaps among the multiple fine particles can be narrowed, in the other words, the multiple fine particles can be rearranged. At this time, by leaving the multiple fine particles completely free, when the gaps are narrowed as mentioned above, the multiple fine particles are regularly arranged into the closest packing state. When the multiple fine particles enter the closest packing state, the gaps among the multiple fine particles are also further closely narrowed into the regularly-arranged state, which allows the carbon nanotubes can very closely and regularly link.

In the invention, the wording "closest packing" means that the fine particles are closest-packed, that is they are closest-arranged, although it is not always meant that they are closest-filled correctly. In considering the "closest packing" state, the carbon nanotubes packed at the gaps among the fine particles and other objects mentioned later should be included. Of course, it is usually difficult for the carbon nanotubes to enter the so-called "closest packing" state with other objects being present. In the invention, the state, in which the carbon nanotubes are closest-packed, or the state, in which the carbon nanotubes are very closed, is defined as "closest-packing". For this reason, the conditions of the fine particles shown in FIG. 3 and in the enlarged electronic microscopic pictures of FIG. 4 and FIG. 5 already referenced are all included in the concept of "closest-packing".

In other words, in the invention, by evaporating a certain amount of the liquid from the liquid with at least the multiple fine particles dispersed, which covers the multiple carbon nanotubes, the multiple fine particles are arranged with the gaps among them left and the liquid bridges are formed, at which the multiple carbon nanotubes link, and by further evaporating the liquid to much more close the multiple fine particles, the multiple fine particles are rearranged into the "closest-packing" state. Of course, it is possible that by precipitating the multiple fine particles freely in the liquid with the multiple carbon nanotubes contained, the multiple fine particles can be closed and rearranged into the "closest-packing" state.

Addition of Other Objects

In making the multiple carbon nanotubes linked at the liquid bridges, by adding additional other objects in the liquid with the multiple fine particles dispersed, which is used for forming the liquid bridges, the multiple carbon nanotubes can be structured and arranged together with the other objects. Concretely, by mixing the additional other objects in the liquid with the carbon nanotubes and the multiple fine particles dispersed if necessary, which is used for forming the liquid bridges, when the multiple carbon nanotubes link, the multiple carbon nanotubes are structured and arranged with the other objects added.

At this time, in particular, by preventing the other objects from being trapped by the multiple objects for forming the liquid bridges or the multiple portions of the object (thereafter, they may be simply referred to as "the multiple objects and the like"), the other objects can be arranged and structured at the gaps among the carbon nanotubes each other and/or in the vicinity of them. Further, by allowing the other objects to be trapped by the multiple objects for forming the liquid bridges, the other objects can be arranged and structured between the multiple objects and the carbon nanotubes.

Whether the other objects may or may not be trapped by the multiple objects for forming the liquid bridges depends on, for example, the conditions such as 1) positively or negatively charged objects such as ionized molecules or atoms are added to make use of electric attraction or repulsion, 2) a combination of the objects having chemically-opposite affinities such as hydrophile and lipophile is used, 3) convex-concave structures are added on surfaces of the fine particles to form additional portions of the other objects, which are easy to engage or entangle with the convex-concave structures, and 4) an inter-molecule recognition function is added.

By arranging and structuring the other objects at the gaps among and/or in the vicinity of the carbon nanotubes, various functions can be added to the resulting carbon nanotube structures. After the carbon nanotubes have been structured, using any method (for example, 1) the objects are exposed to vapor, which is called vacuum deposition, 2) a solution with target objects included is dropped, which is called pigmentation, 3) the temperature is raised and dropped alternately to cause fine cracks by a difference between thermal expansion coefficients for intrusion, and 4) electrons, atoms, ions, molecules, or particles are implanted at an accelerating speed), the other objects may be arranged at the gaps among and/or in the vicinity of the carbon nanotubes.

The other objects include, for example, atoms, molecules, ions, particles, polymers, molecules and tissues extracted from the organisms, which have such characteristics as insulation, conductivity, semi-conductivity, absorbance, luminescence, color development property, elasticity, electricity inducing property, and photosensitivity. Any other objects having the characteristics, which may vary with a temperature, humidity, or atmospheric gas, may be used instead.

The other objects having a designed function such as functional molecules or functional particles also may be used. Recently, it has been discovered that most of molecules and particles have semi-conductivity, which allows the switching and memory functions to be added to contacts among the carbon nanotubes or to an aggregation point of the carbon nanotubes.

As the functional molecules, the molecules, which are internally positively or negatively charged, are preferable, for example, molecules, in which a molecular species with charge-donation and a molecular species with charge-competence are combined, molecules, in which symmetrical molecules are combined with molecular species with charge-donating or charge-attracting, giant molecules, which are made up of repetition of the molecules mentioned above, or molecules, which are forced to function by a collection of these molecules. Note that the charge-donation and the charge-competence mentioned above may be defined in terms of electron affinity, or ionization potential values.

In addition, biomolecules such as DNAs and collagen or artificial molecules, which simulate organisms, can be used, which allows the functions similar to those of the organisms to be added.

The functional particles include metal particles, for example, gold, metal oxide particles such as $ZnO_2$ and $TiO_2$, inter-metallic compound particles made of an alloy, and vecicle, ceramics, fullerene, derivatives of fullerene, polymer particles, micellar structures in a liquid, colloidal particles, and lipid, and depending on its application, compounds of the particles or the treated particles can be used.

For example, if gold nanopartcles are used as the functional fine particles, the characteristics of a conductive network made of the carbon nanotubes can be improved.

The functional molecules and the functional fine particles are added to the liquid with the carbon nanotubes and if necessary the fine particles dispersed.

Since the functional molecules and the functional fine particles are too small to handle, it is preferably designed to correctly arrange them based on inter-recognition, rather than by modification using chemical functional groups.

With respect to the other objects, it is preferred that at least some of them are arranged at the gaps among the carbon nanotubes each other. By arranging them at the gaps among the carbon nanotubes, the functionality mentioned above can be correctly added. At this time, it is a preferable mode that at least some of the other objects have a bridging function, which bridges between the carbon nanotubes. This means that by bridging between the carbon nanotubes using the other objects, the carbon nanotube structures can be constructed into one structure similar to a molecular structure as a whole, the functionality mentioned above is added overall. In addition, the bridging function can be used to make close contact between the structured and arranged carbon nanotubes, which allows the carbon nanotube structures to be strongly fixed into solid structures.

For the bridging function to be implemented, any of the atoms, molecules, ions, particle, and fibers with two or more portions having such a characteristic that it is difficult to separate after they have got contact with the carbon nanotubes may be used. It is preferable that the carbon nanotubes themselves are pre-treated. For example, after the carbon nanotubes have been treated with a strong acid solution, they have carbonyl groups (COOH) and in this case, bridging between the carbon nanotubes is easily achieved by the molecules containing functional groups such as hydroxyl groups (OH), amino acid ($NH_2$), and thiol group (SH), which are prone to react with the carbonyl group.

The carbon nanotubes containing water-soluble functional groups such as carbonyl groups can be ionized in a water solution to achieve the bridged structures using multivalent ions. For example, in the state that carboxylic acid is ionized ($COO^-$), calcium ions ($Ca^{2+}$), magnesium ions ($Mg^{2+}$), and aluminum ions ($Al^{3+}$) can be used.

Specific Examples of Liquid Bridges Formed by Multiple Objects and Arranging Them Some concrete examples of the liquid bridges are described below.

Figure 6:
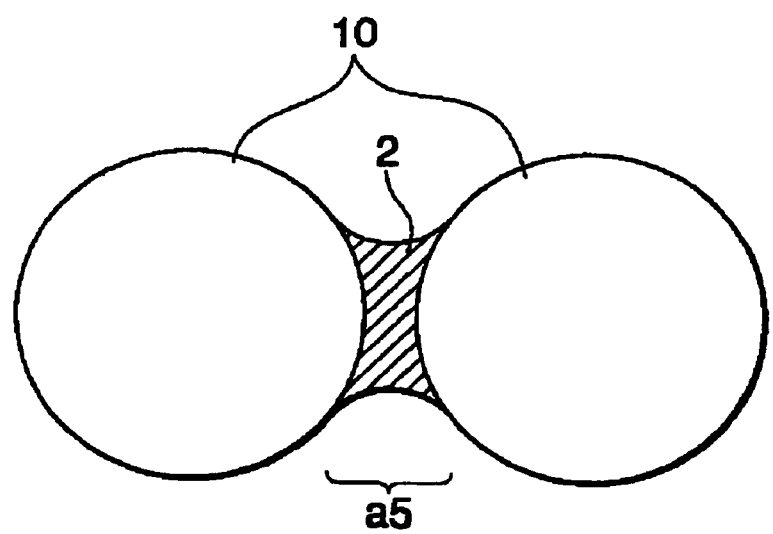
FIG. 6 is a schematic view showing an example of a condition, in which the liquid bridge is formed between two spherical objects to manufacture the carbon nanotube structure of the present invention.

FIG. 6 is a schematic plan view showing an example using two spheres as the multiple objects. At the gap between two spheres 10, a liquid bridge a5 is formed by the liquid 2 with the carbon nanotubes dispersed (not indicated in the figure), at which the carbon nanotubes gather and are linked together and structured. Thus, for example, by evaporating the liquid 2 and removing the spheres 10 as required, only the carbon nanotube structures are obtained. The resultant carbon nanotube structures can be used for electric elements, in which electric characteristics of the carbon nanotube structures are applied. As mentioned above, by structuring the multiple carbon nanotubes together with the other objects, the carbon nanotube structures having various characteristics corresponding to those of the other objects to be added can be achieved.

Figure 7:
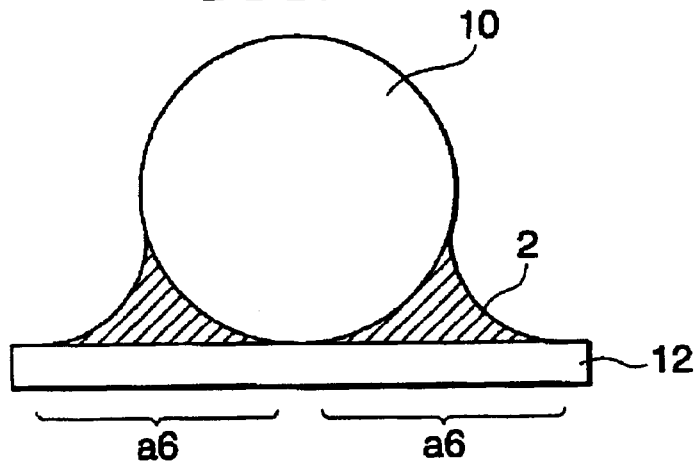
FIG. 7 is a schematic view showing an example of a condition, in which the liquid bridges are formed between the spherical object and the board to manufacture the carbon nanotube structure of the present invention.

FIG. 7 is a schematic sectional view showing an example using a sphere mounted on a board as one of the multiple objects. This means that in the example, the sphere 10 and the board 12 serve as the "multiple objects". The sphere 10 is mounted on the board 12 with fine gaps formed on both sides of a contact point between them as shown in FIG. 7. At the gaps, the liquid bridges a6 are formed by the liquid 2 with the carbon nanotubes (not indicated in the figure) dispersed, at which the carbon nanotubes gather and are linked together and structured. In this case, on the surface of the board 12, the carbon nanotubes gathering each other are linked, structured and arranged into a circle (not indicated in the figure). For this reason, for example, by evaporating the liquid 2 and removing the sphere 10 as required, only the carbon nanotubes structured into the circle is left on the surface of the board 12. The resultant carbon nanotube structure can be used as a circular electronic element, in which the electric characteristics of the carbon nanotubes are applied. In addition, as mentioned above, by structuring the multiple carbon nanotubes together with the other objects, the carbon nanotube structures having various characteristics corresponding to those of the other objects to be added can be achieved. Note that after the sphere 10 has been removed, within the circle, none exists, that is a hollow is formed.

Figure 8A:
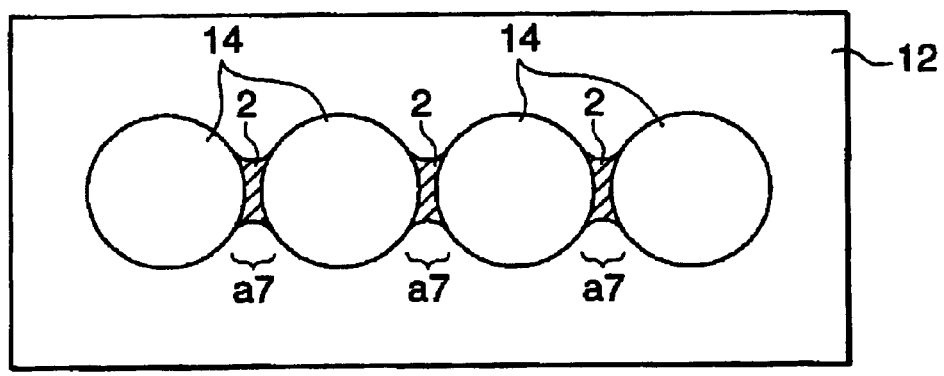
FIG. 8A and FIG. 8B are schematic plan views showing an example of a first pair of different conditions, in which the liquid bridges are formed to manufacture the carbon nanotube structures of the present invention, FIG. 8A illustrating a first condition, in which a little amount of liquid forms the liquid bridges and FIG. 8B illustrating a second condition, in which a large amount of liquid forms the liquid bridges, respectively.
Figure 8B:
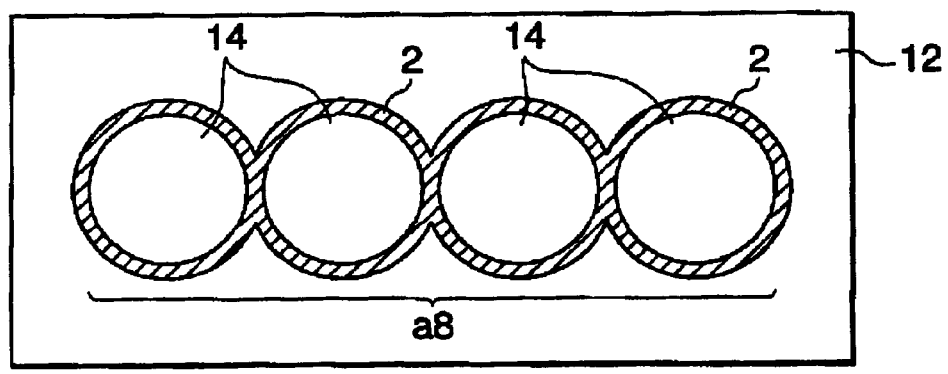

FIG. 8 is a schematic plan view showing an example, in which spheres 4 linearly mounted on the board are used as the multiple objects. FIG. 8A shows a condition, in which a small amount of the liquid 2 forms the liquid bridges while FIG. 8B shows a condition, in which a larger amount of the liquid 2 forms the liquid bridges.

In the case of FIG. 8A, since the amount of the liquid 2 with the carbon nanotubes (not indicated in the figure) dispersed is small, only fine liquid bridges a7 are formed at the gaps among spheres 14, at which the carbon nanotubes gather and are linked together and structured. At this time, the liquid 2 forming the liquid bridges reach the board 12, which means that the liquid bridges a7 are formed not only at the gaps among the spheres 14 but also at the gaps between them and the board 12. For this example, for instance, by evaporating the liquid 2 and removing the spheres 14 as required, three carbon nanotube structures can be formed on the surface of the board 12 at the same time. They can be used as electric elements, in which the characteristics of the carbon nanotubes are applied. In addition, as mentioned above, by structuring the carbon nanotubes together with the other objects, the carbon nanotube structures having various characteristics corresponding to those of the other objects to be added can be achieved.

On the other hand, for FIG. 8B, since the amount of the liquid 2 with the carbon nanotubes (not indicated in the figure) dispersed is larger than that in FIG. 8A, the liquid bridges a8 are formed not only at the gaps among the spheres 14 but also around the spheres 14. This means that the liquid bridges a8 are formed into a chain of four rings at interfaces between the board 12 and spheres 14. The carbon nanotubes gather and are linked together and structured at the liquid bridges a8. For this reason, for instance, by evaporating the liquid 2 and removing the spheres 14 as required, only the carbon nanotubes structured into a chain of four rings are left on the surface of the board 12, which allows a wiring with a shape of a chain of four rings to be achieved on the surface of the board 12. Alternately, the resultant carbon nanotube structure can be used as a device made of a chain of four ring electric elements, in which the electric characteristics of the carbon nanotubes are applied. As mentioned above, by structuring the carbon nanotubes together with the other objects, the carbon nanotube structures having various characteristics corresponding to those of the other object to be added can be achieved. Note that after the spheres 14 have been removed, within the circles, none exists, that is, hollows are formed.

Figure 9A:
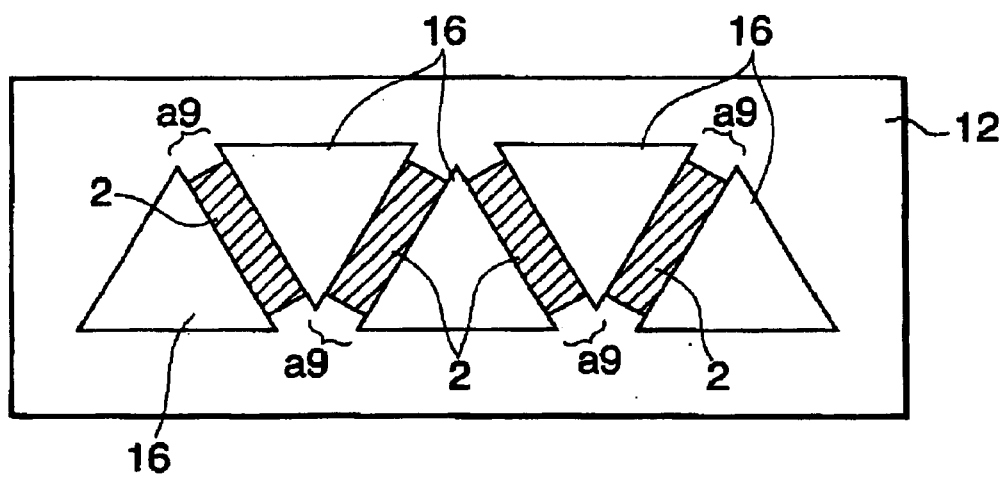
FIG. 9A and FIG. 9B are schematic plan views showing another example of a second pair of different conditions, in which the liquid bridges are formed to manufacture the carbon nanotube structures of the present invention.
Figure 9B:
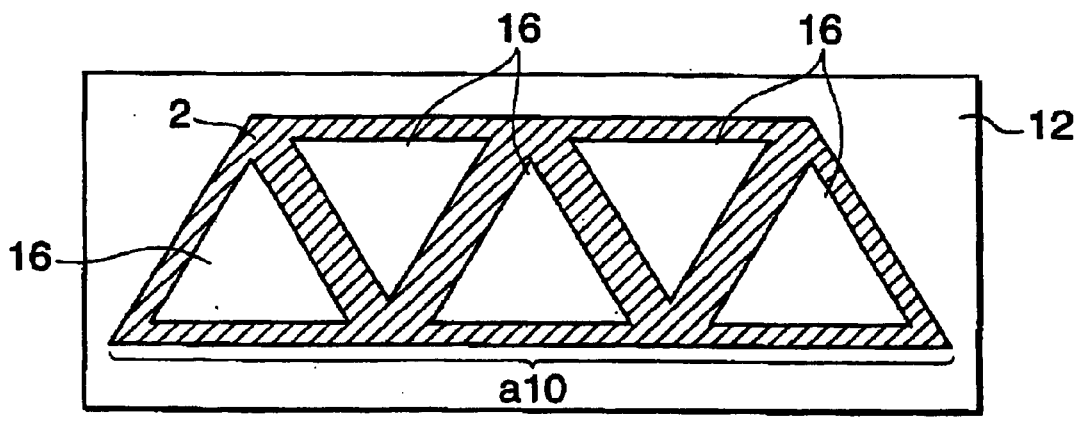

FIG. 9 is a schematic plan view showing an example, in which five triangular prisms linearly mounted on the board are used as the multiple objects. In FIG. 9A, a small amount of liquid 2 forms the liquid bridges while in FIG. 9B, a larger amount of liquid 2 forms the liquid bridges.

In the case of FIG. 9A, since the amount of the liquid 2 with the carbon nanotubes (not indicated in the figure) dispersed is small, only fine liquid bridges a9 are formed at the gaps among triangular prisms 16 each other, at which the carbon nanotubes gather and are linked together and structured. At this time, the liquid 2 forming the liquid bridges a9 reached the board 12, which means that the liquid bridges a9 are formed not only at the gaps among the triangular prisms 16 but also at the gaps between them and the board 12. For this example, for example, by evaporating the liquid 2 and removing the triangular prisms 16 as required, four linear carbon nanotube structures linked together and arranged at angles with each other can be formed on the surface of the board 12 at the same time, which allows a wiring with a shape mentioned above to be achieved. Alternately, they can be used as four electric elements, in which the characteristics of the carbon nanotubes are applied. In addition, as mentioned above, by structuring the carbon nanotubes together with the other objects, the carbon nanotube structures having various characteristics corresponding to those of the other objects to be added can be achieved.

On the other hand, for FIG. 9B, since the amount of the liquid 2 with the carbon nanotubes (not indicated in the figure) dispersed is larger than that in FIG. 9A, the liquid bridges a10 are formed not only at the gaps among the triangular prisms 16 but also around the triangular prisms 16. This means that the liquid bridges a10 are formed into a chain of five triangles at the interfaces between the board 12 and the triangular prisms 16. The carbon nanotubes gather and are linked together and structured at the liquid bridges a10. For this reason, for example, by evaporating the liquid 2 and removing the triangular prisms 16 as required, only the carbon nanotubes structured into a chain of five triangles are left on the surface of the board 12, which allows a wiring with a shape mentioned above to be achieved on the surface of the board 12. Alternately, the resultant carbon nanotube structure can be used as a device made of a chain of five triangular electric elements, in which the electric characteristics of the carbon nanotubes are applied. As mentioned above, by structuring the carbon nanotubes together with the other objects, the carbon nanotube structures having various characteristics corresponding to those of the other object to be added can be achieved. Note that after the triangular prisms 16 have been removed, within the triangles, none exists, that is, hollows are formed.

Figure 10A:
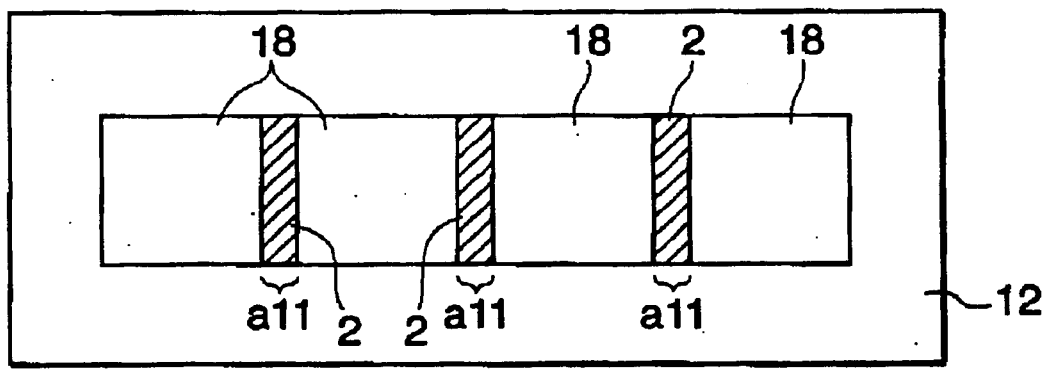
FIG. 10A and FIG. 10B are schematic plan views showing yet another example of a third pair of different conditions, in which the liquid bridges are formed to manufacture the carbon nanotube structures of the present invention.

FIG. 10A is a schematic plane view showing an example, in which four cubes linearly mounted on the board are used as the multiple objects. In FIG. 10A, a small amount of liquid 2 forms the liquid bridges while in FIG. 10B, a larger amount of liquid 2 forms the liquid bridges.

In the case of FIG. 10A, since the amount of the liquid 2 with the carbon nanotubes (not indicated in the figure) dispersed is small, only fine liquid bridges a11 are formed at the gaps among cubes 18, at which the carbon nanotubes gather and are linked together and structured. At this time, the liquid 2 forming the liquid bridges a11 reached the board 12, which means that the liquid bridges a11 are formed not only at the gaps among the cubes 18 each other but also at the gaps between them and the board 12. For this example, for example, by evaporating the liquid 2 and removing the cubes 18 as required, three carbon nanotube structures linking linearly and parallel to each other can be formed on the surface of the board 12 at the same time, which allows wiring with a shape mentioned above to be achieved. Alternately, they can be used as three electric elements, in which the characteristics of the carbon nanotubes are applied. In addition, as mentioned above, by structuring the carbon nanotubes together with the other objects, the carbon nanotube structures having various characteristics corresponding to those of the other objects to be added can be achieved.

Figure 10B:
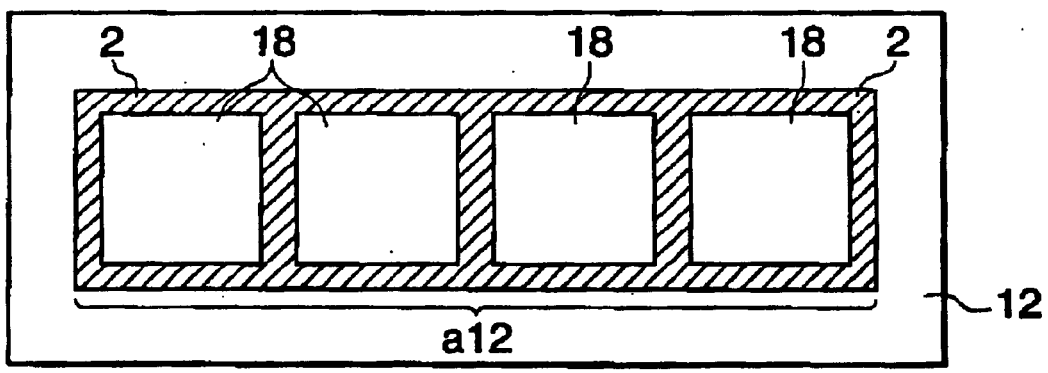

On the other hand, for FIG. 10B, since the amount of the liquid 2 with the carbon nanotubes (not indicated in the figure) dispersed is larger than that in FIG. 10A, the liquid bridges a12 are formed not only at the gaps among the cubes 18 but also around the cubes 18. This means that the liquid bridges a12 are formed into a chain of four squares at the interfaces between the board 12 and the cubes 18. The carbon nanotubes gather and are linked together and structured at the liquid bridges a12. For this reason, for example, by evaporating the liquid 2 and removing the cubes 18 as required, only the carbon nanotubes structured into a chain of four cubes are left on the surface of the board 12, which allows a wiring with a shape mentioned above to be achieved on the surface of the board 12.

Alternately, the resultant carbon nanotube structure can be used as a device made of a chain of four cubic electric elements, in which the electric characteristics of the carbon nanotubes are applied. As mentioned above, by structuring the carbon nanotubes together with the other objects, the carbon nanotube structures having various characteristics corresponding to those of the other object to be added can be achieved. Note that after the cubes 18 have been removed, within the squares, none exists, that is, hollows are formed.

In various examples described above, "the multiple objects" have been explained giving the examples, in which 1 to 5 objects are used, although of cause, more objects may be arranged. For example, a layer of "multiple objects" can be arranged on the board to achieve a two-dimensional plain carbon nanotube structure or several layers of them can be overlapped to achieve a film carbon nanotube structure. In addition, the "multiple objects" can be laminated to achieve a three-dimensional carbon nanotube structure, namely a lump. According to this invention, the carbon nanotube structures can be controlled as a whole in this way.

Although the sizes of the spheres, triangular prisms, and cubes are not limited, it is preferable that they are fine particles to achieve plain, film, and lump carbon nanotube structures. The preferable sizes of the fine particles are described later.

In addition, other liquid bridges are described giving some examples below.

FIG. 11 is a schematic sectional view showing an example, in which plate elements are used as the multiple objects. In FIG. 11A, a plate element 20a is fixedly made contact vertically by the other plate element 20b, both of which are the multiple objects. The liquid bridges a13 are formed at an interface between the plate element 20a and the plate element 20b. In FIG. 11B, the liquid bridges a13 similar to those in FIG. 11A are formed except that a T-shape plate element is used as the multiple objects. Although the plate element 20c is one element, the liquid bridges are formed at two sites of the plate element 20c, which are a flat bottom 20c' and a vertical part 20c". FIG., 11B shows an example, in which the "multiple objects" is made up of one object.

At the liquid bridges a13 formed in FIG., 11A, the carbon nanotubes link to be structured. In this way, the carbon nanotube structures are formed at the contacts between the plate member 20b or the vertical part 20c" and the plate element 20a or the flat bottom 20c'. For this example, for example, by evaporating the liquid 2 and/or removing the plate element 20b or the vertical part 20c" as required, two carbon nanotube structures linking linearly and parallel to one another can be formed at the same time, which allows wiring with shape mentioned above on the surface of the plate element 20a (or/and the plate element 20b) or the plate element 20c". Alternately, they can be used as two electric elements, in which the characteristics of the carbon nanotubes are applied. Note that after the plate element 20b or the vertical part 20c" has been removed, at the linear gaps between two carbon nanotube structures one another, none exist, that is, hollows are formed.

Figure 11A:
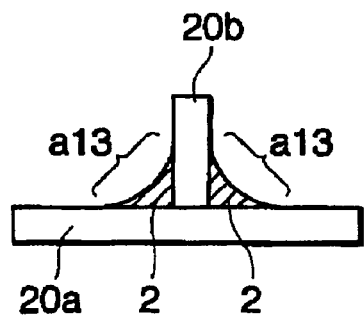
FIG. 11A, FIG. 11B, FIG. 11C, FIG. 11D, and FIG. 11E are schematic sectional views showing an example of five different conditions, in which the liquid bridges are formed using plate members to manufacture the carbon nanotube structures of the present invention, FIG. 11A illustrating a first condition, in which the plate member is fixedly contacted vertically with another one, FIG. 11B illustrating a second condition, in which the framework having the same shape as that illustrated in FIG. 11A is formed by one plate element, FIG. 11C illustrating a third condition, in which the plate member is fixedly contacted vertically with five other plate members, FIG. 11D illustrating a fourth condition, in which the same shape of framework as that illustrated in FIG. 11C is formed by one plate element, and FIG. 11E illustrating a fifth condition, in which a top-down framework is formed by the same plate members as those illustrated in FIG. 11C.
Figure 11B:
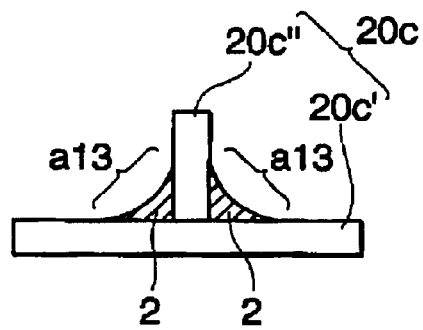
Figure 11C:
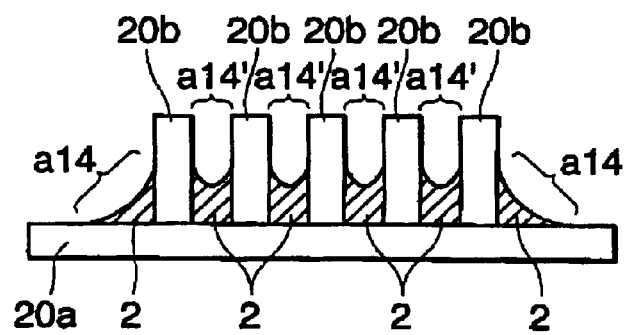
Figure 11D:
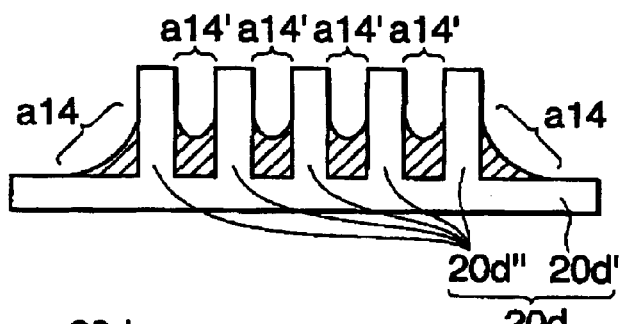

On the other hand, in FIG. 11C, the plate element 20a is made contact by other five plate elements 20b, among which fine gaps are formed. At the gaps, the liquid bridges may be formed. This means that as in FIG. 11A, the liquid bridges a14 are formed at the interfaces between the plate element 20a and the plate elements 20b at the ends and the liquid bridges a14' are formed at the gaps among the plate elements 20b as well. In FIG. 11D, the liquid bridges a14 and a14' similar to those shown in FIG. 11C are formed except that a comb-shaped plate element is used as the "multiple objects". Although the plate element 20d is one element, the liquid bridges are formed at six sites formed between the flat bottom 20d' and five vertical parts 20d". FIG. 11D shows one of the examples, in which the "multiple objects" are made up of one object.

Figure 11E:
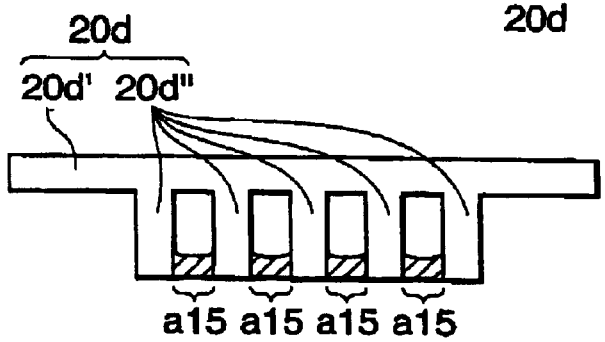

At the liquid bridges a14 and a14' formed in FIG. 11C, the carbon nanotubes gather and are linked together and structured. In this way, the carbon nanotube structures are formed at the contacts between the plate member 20b or the vertical part 20c" and the plate element 20a or the flat bottom 20d'. For this example, for instance, by evaporating the liquid 2 and/or removing the plate element 20b or the vertical part 20d" as required, six carbon nanotube structures linking linearly and parallel to each other can be formed at the same time, which allows wiring with shape mentioned above on the surface of the plate element 20a (or/and the plate element 20b) or the surface of the plate element 20d. Alternately, they can be used as six electric elements, in which the characteristics of the carbon nanotubes are applied. Note that after the plate element 20b or the vertical part 20d" has been removed, at the linear gaps among six carbon nanotube structures each other, none exist, that is, hollows are formed To form the liquid bridges using the plate elements shown in FIG. 11C or FIG. 11D, it may be done that as shown in FIG. 11E, the plate element 20d is turned bottom up and the four liquid bridges a15 only at ends of the vertical part 20d". At the liquid bridges a15, the carbon nanotubes can gather and be linked and structured to form the carbon nanotube structures at the sites apart form the flat bottom 20d'. Note that although in FIG. 11E, how to form the carbon nanotube structures using the plate elements 20d shown in FIG. 11D is described, the plate element 20a and plate element 20b shown in FIG. 11C can be used as well.

Figure 12:
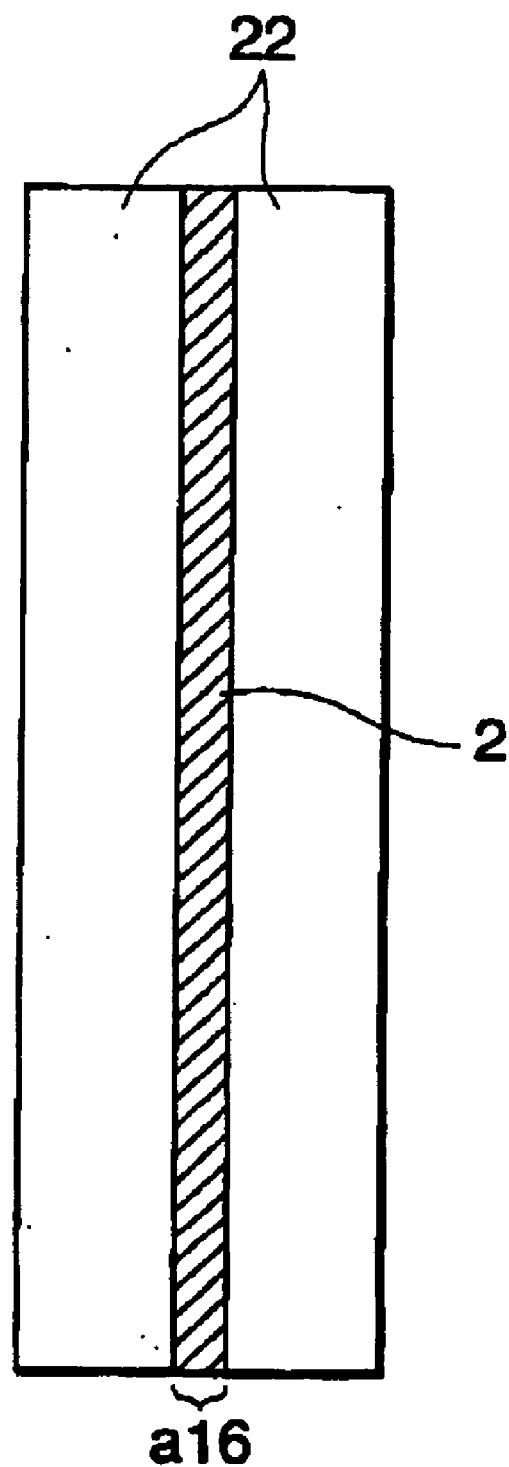
FIG. 12 is a schematic sectional view showing an example of a condition, in which the liquid bridge is formed using two long prisms to manufacture the carbon nanotube structure of the present invention.

FIG. 12 is a schematic view showing an example, in which two long prisms are used as the multiple objects. The liquid bridges a16 are formed by the liquid 2 with the carbon nanotubes (not indicated in the figure) dispersed at the longitudinal gap between two prisms 22, at which the carbon nanotubes gather and are linked together and structured. For this reason, for instance, by evaporating the liquid 2 and one or both of the prisms 22 as required, the carbon nanotube structure formed at the gap between the prisms 22 or on the surfaces of them or only the carbon nanotube structure can be obtained. The resultant carbon nanotube structure is used as an electrical lead as well as the electric element, in which the characteristics of the carbon nanotubes are applied. As mentioned above, by structuring the carbon nanotubes together with the other objects, the carbon nanotube structures having various characteristics corresponding to those of the other object to be added can be achieved.

Figure 13A:
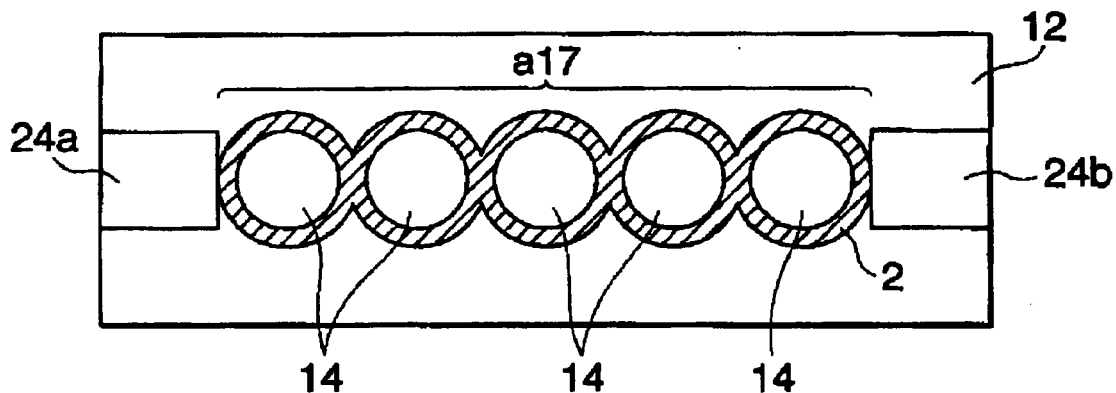
FIG. 13A and FIG. 13B are schematic sectional views showing an example of two different conditions, in which the liquid bridges are formed by multiple spherical particles mounted on the boards, which connect between a couple of electrodes to manufacture the carbon nanotube structures of the present invention, FIG. 13A illustrating a first condition, in which a couple of electrodes are oppositely disposed one another and the spherical particles are arranged to connect between them along a straight line and FIG. 13B illustrating a second condition, in which a couple of electrodes are disposed at the ends on a semi-diagonal line and the spherical particles are arranged to connect between them on a curve.
Figure 13B:
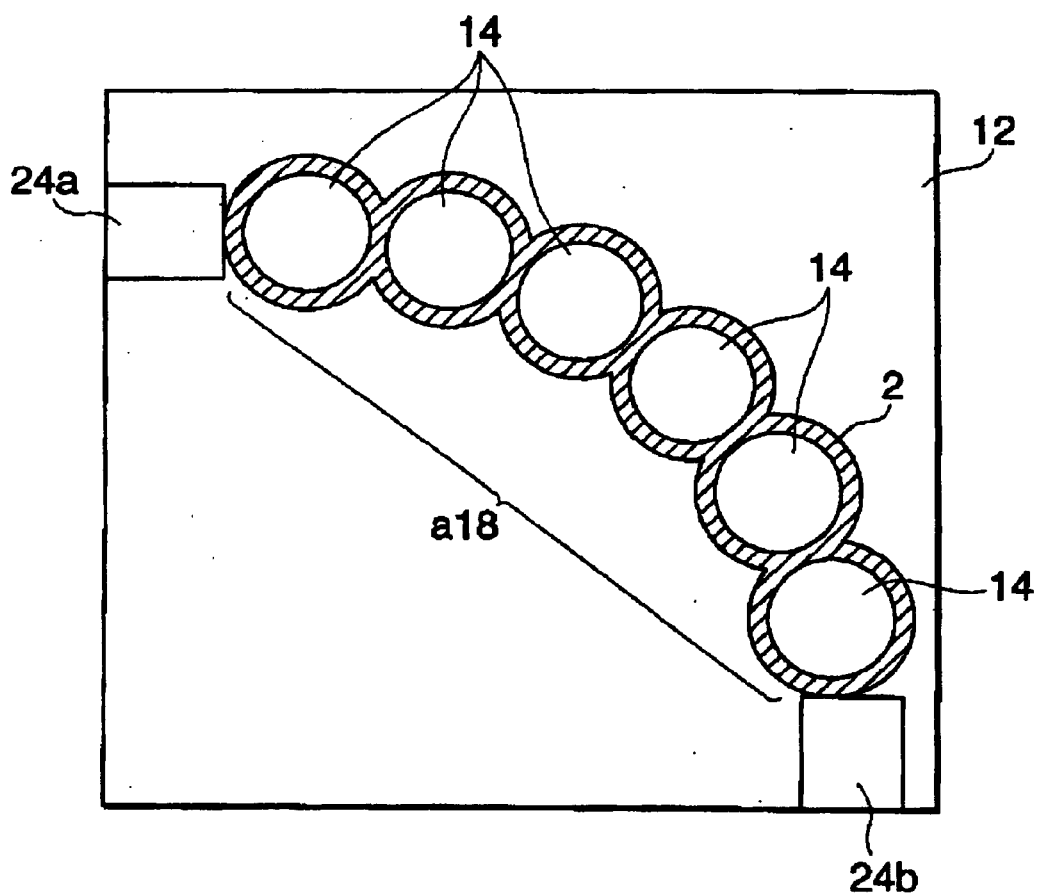

FIG. 13 is a schematic plan view showing an example, in which five or six spheres mounted on the board are used as the multiple objects and a chain of spheres connect between two electrode terminals. In FIG. 13A, an electrode terminal 24a and an electrode terminal 24b are disposed oppositely on the board 12 and the spheres 14 connect them on a straight line and in FIG. 13B, the electrode terminal 24a and the electrode terminal 24b are disposed on a semi-diagonal on the board 12 and the spheres 14 connect them on a curve.

Figure 14:
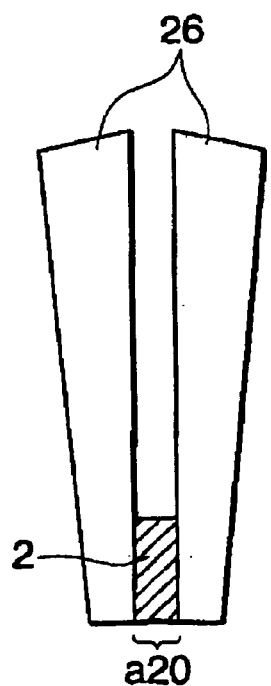
FIG. 14 is a schematic sectional view showing an example of a condition, in which the liquid bridge is formed using two needle elements to manufacture the carbon nanotube structure of the present invention.

In any example, the liquid bridges a17 and a18 are formed at the gaps among the spheres 14 and at an interface between the board 12 and a chain of spheres 14. This means that in FIG. 13A, the liquid bridges a17 take the shape of a straight chain of five rings while in FIG. 13B, the liquid bridges a18 take the shape of a curved chain of six rings. The carbon nanotubes gather and are linked together and structured at the liquid bridges a8. For this reason, for instance, by evaporating the liquid 2 and removing the spheres 14 as required, only the carbon nanotubes structured into a chain of five or six circles are left on the surface of the board 12, connecting between the electrode terminal 24a and the electrode terminal 24b, which allows a wiring with a shape mentioned above on the surface of the board 12. Alternately, they can be used as an electric device, which is made up of a chain of circular electric elements, in which the electric characteristics of the carbon nanotubes are applied. As mentioned above, by structuring the carbon nanotubes together with the other objects, the carbon nanotube structures having various characteristics corresponding to those of the other object to be added can be achieved. Note that after the spheres 14 have been removed, within five or six circles, none exist, that is, hollows are formed FIG. 14 is a schematic view showing an example, in which two needles are used as the multiple objects. For two needles, for instance, manipulators can be used. With their ends closed one another, by soaking the needles 26 in the liquid with the carbon nanotubes (not indicated in the figure) dispersed and then taking out them, the liquid bridges a20 can be formed between the ends of the needles 26. The carbon nanotubes gather and are linked together and structured at the liquid bridges a20. By evaporating the liquid 2 from this point, the carbon nanotubes are structured connecting between the ends of the needles 26 and if any conductive objects are used for the needles 26, the electric characteristics of the carbon nanotubes can be measured. Alternately, it can be used as an electric element with terminals of the needles 26, in which the electric characteristics of the carbon nanotubes are applied. In addition, as mentioned above, by structuring the carbon nanotubes together with the other objects, the carbon nanotube structures having various characteristics corresponding to those of the other object to be added can be achieved.

Figure 15:
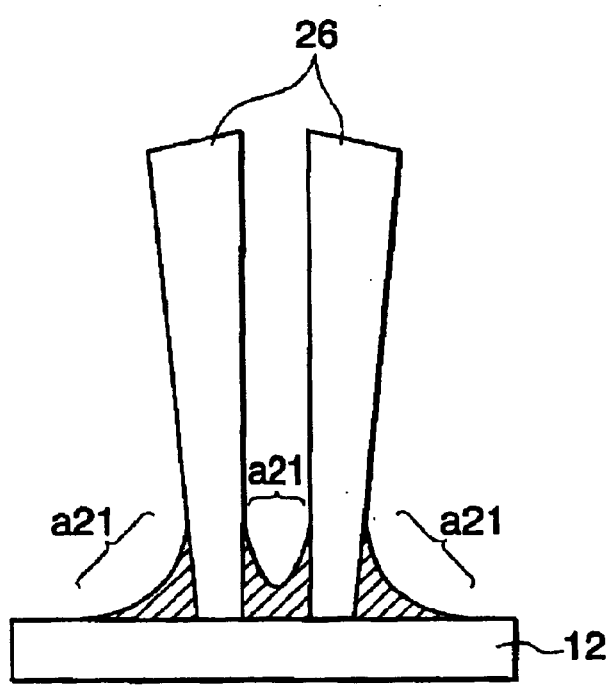
FIG. 15 is a schematic sectional view showing an example of a condition, in which two needle elements are used and the liquid bridges are formed between them rising on the board.

FIG. 15 is a schematic view showing an example, in which two needles as in the example described above are used as the multiple objects and they are contacted with the board. For two needles 26, for example, manipulators can be used as in the example described above. With their ends closed one another and contacted with the board 12, the liquid bridges a21 are formed by the liquid 2 with the carbon nanotubes (not indicated in the figure) dispersed. For example, by contacting the ends of the needles 26, between which the liquid bridges a20 are formed in the example shown in FIG. 14 described above, with the board 12, the liquid bridges a21 can be formed.

Figure 16A:
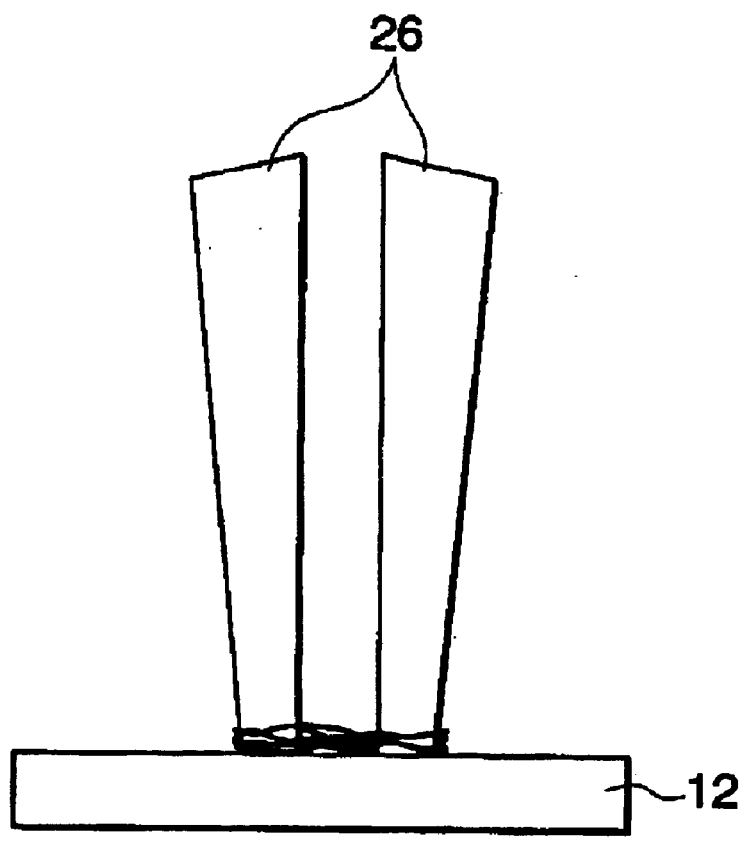
FIG. 16A is a schematic view showing a condition, in which the tips of the needle elements illustrated in FIG. 15 are closed
Figure 16B:
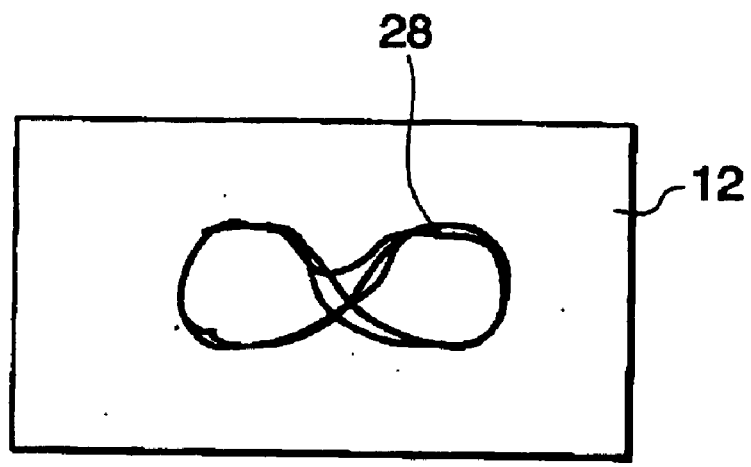
FIG. 16B is a plan view showing in the condition illustrated in FIG. 16A, the carbon nanotube structures formed on the surface of the board.
Figure 17A:
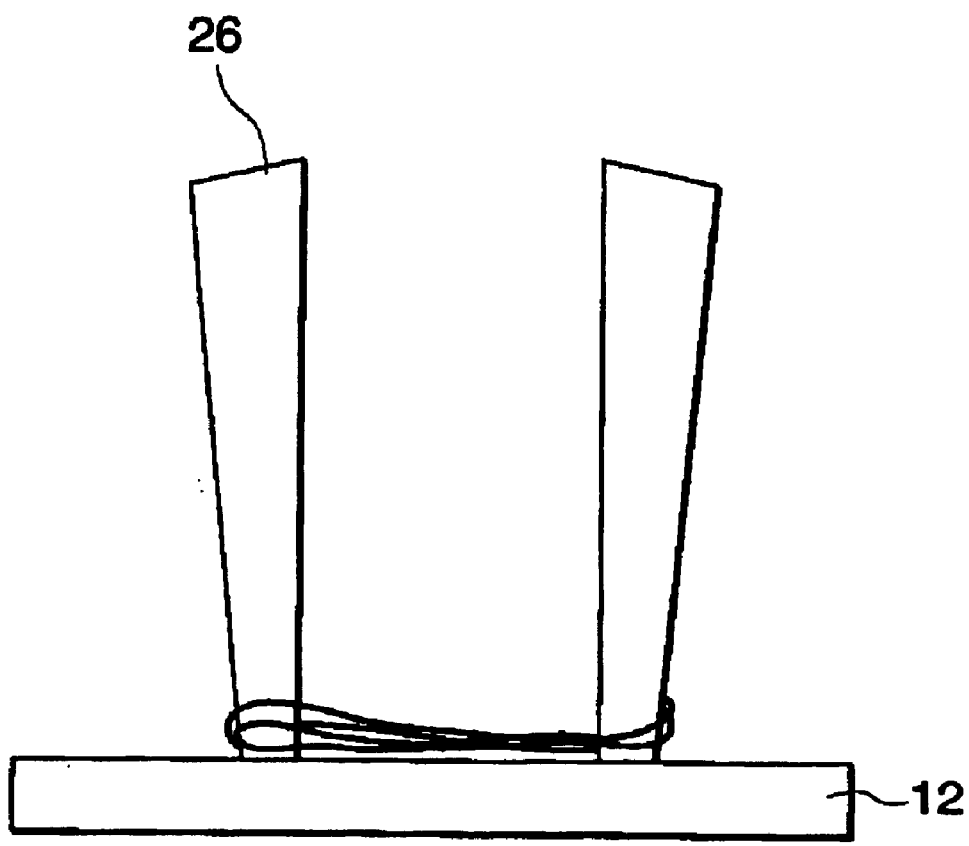
FIG. 17A is a schematic view showing a condition, in which the tips of the needle elements illustrated in FIG. 15 are disposed at a distance from one another
Figure 17B:
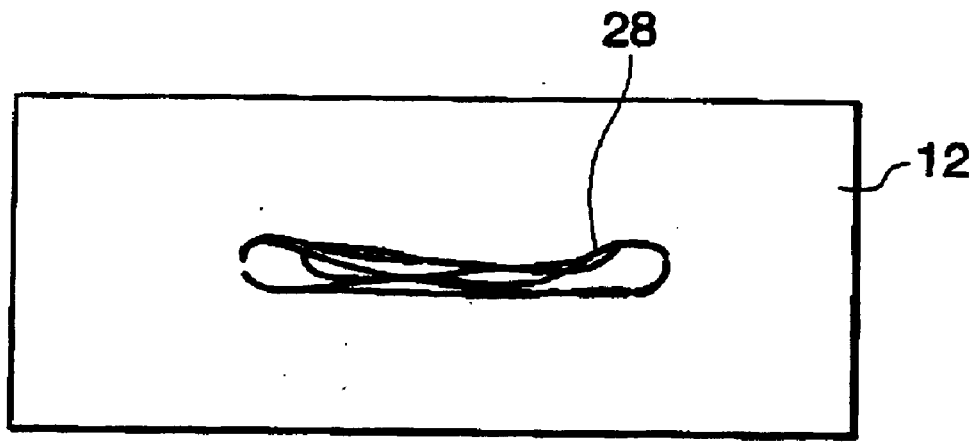
FIG. 17B is a plan view showing, in the condition illustrated in FIG. 17A, the carbon nanotube structures formed on the surface of the board.

On the surface of the board 12, two circular (8-shaped) liquid bridges a21 are formed with a hollow between the ends of the needles 26 only. At the liquid bridges a20, the carbon nanotubes gather to be structured. At this time, by closing or separating away the ends of the needles 26, the shape of the carbon nanotube structures can be controlled. FIG. 16A is a schematic view showing a condition, in which the ends of the two needles 26 are closed while FIG. 16B is a plan view of the carbon nanotube structures 28 formed on the surface of the board 12 at that time. On the other hand, FIG. 17A is a schematic showing a condition, in which the ends of the two needles 26 are separated apart and FIG. 17B is a plane view of the carbon nanotube structures 28 formed on the surface of the board 12 at that time. By evaporating the liquid 2 and separating the needles 26 from the board 12, the carbon nanotube structures 28 shown in FIG. 16B and FIG. 17B are formed on the surface of the board 12. The resulting carbon nanotube structures 28 can be used as an electric element, in which the electric characteristics of the carbon nanotubes are applied. Further, as mentioned above, by structuring the carbon nanotubes together with the other objects, the carbon nanotube structures having various characteristics corresponding to those of the other object to be added can be achieved. Note that after the ends of the needles 26 have been separated from the surface of the board 12, at the points on the board 12 where the needle 26 initially sit, none exists, that is, hollows are formed.

Details of Individual Components

Carbon Nanotube

In this invention, both SWNT and MWNT can be used for the carbon nanotubes. Generally, SWNT is more flexible than MWNT and MWNT is prone to become less flexible as the number of layers increases. It is preferable that SWNT and MWNT are used as initially intended with their characteristics taken into consideration.

If the multiple fine particles for the multiple objects, the carbon nanotubes gathering at the liquid bridges formed at the gaps among the multiple fine particles each other are also trapped at the liquid bridges formed at the gaps among other several kinds of multiple fine particles at the same time (hereafter, simply referred to as "trapping into the multiple liquid bridges"). The trapped multiple fine particles are structured to bridge between the gaps (liquid bridges) among the multiple fine particles (see FIG. 3). This is a specific phenomenon, which occurs because the carbon nanotubes have flexible fine linear structures. If this phenomenon occurs, it is preferable that SWNT is used. However, for example, if the carbon nanotubes are structured into the objects, of which one side is longer than the length of the carbon nanotube, or if the multiple fine particles form lattices, both SWNT and MWNT may be used because the carbon nanotubes are almost linearly arranged.

Although the applicable lengths and diameters (thickness) of the carbon nanotubes are not limited, the carbon nanotubes with a length in a range of 10 nm to 1000 $\mu$m are generally used, among which the carbon nanotubes with a length in a range of 100 nm 100 $\mu$m are preferably used. In addition, if the multiple fine particles are used as the multiple objects, it is preferable that the length of the carbon nanotube is longer than the average diameter of the multiple fine particles equivalent to that of spheres. Using the carbon nanotubes with a length longer than the average diameter of the multiple fine particles equivalent to that of spheres, they can be trapped into the multiple liquid bridges. This enables the carbon nanotubes to be structured for bridging over the gaps among the multiple fine particles each other (liquid bridges). Note that in this invention, "average diameter equivalent to that of spheres" means, of cause, the average diameter of the spheres (an average in number) when the multiple fine particles are spheres, while it means the average diameter (an average in number) of the spheres with the same volume as those of correct spheres, which is calculated as if they were correct spheres even if they are not. The preferable average of the multiple fine particles equivalent to that of correct spheres is described later.

On the other hand, when the carbon nanotubes form the liquid bridges over the gaps among the portions of a object, it is preferable that the lengths of the multiple carbon nanotubes are longer than the shortest distance of the distances among the multiple portions of the object. Using the carbon nanotubes with this length, the multiple carbon nanotubes link effectively at the liquid bridges and trapped into there. Note that the lengths of the carbon nanotubes referred to as here are those of the carbon nanotubes themselves if they are dispersed in the liquid while they are the whole lengths of bundles if the multiple carbon nanotubes are bundled (bundled state).

Although the diameters (thickness) of the carbon nanotubes are not especially limited, those with a diameter in a range of 1 nm to 1 $\mu$m are generally used, if the carbon tubes with moderate flexibility are desired, the carbon nanotubes with a diameter in a range of 3 nm to 500 nm are preferably used.

Since the unpurified carbon nanotubes contain amorphous carbon and impurities such as catalysts, it is preferable that the carbon nanotubes are purified to remove them. Note that in this invention, no impurities limit its effectiveness.

(The Multiple Objects Forming the Gaps for Making the Liquid Bridges and the Objects Having the Multiple Sites Forming the Gaps for Making the Liquid Bridges)

For the multiple objects forming the gaps for making the liquid bridges and the objects having the multiple sites forming the gaps for making the liquid bridges (hereafter, simply referred to as the "gap-forming objects"), as mentioned above, the fine particles may be used or any other objects may be used. In both cases, the liquid bridges should be formed at the gaps among the multiple objects each other and/or at the gaps at the portions of the object. For this reason, materials with a high affinity to the liquid used for forming the liquid bridges are desirably used. At the liquid bridges, concave portions are formed on the surfaces of the liquid bridges through the interaction between the cohesion among the molecules having the liquid and the adherence of the molecules, which are the power supporting the molecules for adhering to the surfaces of the gap-forming objects at the gaps among the multiple objects each other and/or at the gaps at the multiple portions of the object. However, if the affinity of the gap-forming objects to the liquid for forming the liquid bridges is too small, the adhesion does not sufficiently serve with no liquid bridge formed.

The materials with a high affinity to the liquid for forming the liquid bridges depend on the kind of the liquid. If water is used for the liquid, the materials, which have affinity with no water-repellence, for example, metal, glass, metal oxide, ceramics, and those with any of these materials coated or added can be selected. If the agent for improving wettability such as a surface active agent and water-soluble organic solvent (for example, alcohol and ether) is added into the water or the water-soluble organic solvent is used for the liquid, for example, various kinds of polymers (resins), the particles with these polymers coated on or added to their surfaces, and the specific tissues of organisms can be used. In addition, by physically or chemically pre-treating the gap-forming objects, their affinity to the liquid forming the liquid bridges can be improved, manufacturing the nanotube structures better. On the other hand, depending on the physical or chemical treatment, the affinity of the objects to the liquid forming the liquid bridges can be reduced to form the portions with no liquid bridges formed.

In addition, since the carbon nanotubes follow the behavior of the solution that forms liquid bridges after they gather at the liquid bridges, it is preferable that the surfaces of the gap-forming objects are have such a property that the carbon nanotubes are difficult to fix them. Note that the fixation of the carbon nanotubes is more affected by the shapes than the property of the gap-forming objects, and it is desirable that the shapes of the surfaces are smoother at the gaps among the multiple objects and/or in the vicinity of the gaps formed at the multiple portions of the object.

The shapes of the multiple objects out of the gap-forming objects are not especially limited and any shape of objects can be used provided that the fine gaps, at which the liquid bridges may be formed, may be formed at least among the multiple objects. Specifically, the desired shapes include fine particles, needles, and convex-concave patterns form the board and the like.

For the needles, the objects with slender ends, which can serve as needles, may be used. Recommended materials for the needles include various kinds of metals, glass, and carbon nanotubes. Thin films may be coated on them.

For the multiple fine particles, there is no special limitation and any kinds of fine particles may be used provided that the fine gaps, at which the liquid bridges may be made among the multiple objects, can be formed. The recommended fine particles include particles, fibers, crystals, and aggregates.

The particles available for the multiple fine particles include organic particles such as polymer, inorganic particles such as ceramics and metals, and mixtures of both kinds of particles. Moreover, depending on their intention, both the particles produced by grinding and the particles, of which sizes are physically or chemically controlled at manufacturing, can be used.

The fibers available for the multiple fine particles include artificial fibers such as polyester and nylon, natural fibers such as cotton, and organismic fibers such as spider's thread.

The crystals available for the multiple fine particles include internal structures filled with fine molecules, atoms, and particles in them and regularly-arranged structures. Especially, metallic crystals, non-metallic crystals, ionic crystals, molecular crystals, and particle crystals may be used. The crystals, which exist stably in the natural world, can be used.

The aggregates available for the multiple fine particles include amorphous materials, in which atoms aggregate, molecular aggregates, in which molecules aggregate, particle aggregates, in which particles aggregate, and compound aggregates, in which several kinds of aggregates are mixed. Since these particles are the aggregates of fine molecules, atoms, and/or particles, the internal alignment regularity is undefined.

As mentioned above, various kinds of shapes may be selected for the fine particles provided that the structures of the carbon nanotube structures to be achieved can be controlled. It is preferable that polymeric fine particles are selected, which are easy to manufacture into various shapes and from which after the structures have been formed, the matrix can be formed (described later) by melting them to remove unwanted portions and by solidifying them again. In particular, latex fine particles commercially available are preferably used, of which sizes and shapes are easy to control. Since the latex fine particles are chemically synthesized, they offers a benefit; it is easy to chemically modify their surfaces and to get the desired characteristics once they have been manufactured as carbon nanotube structures.

For the polymeric fine particles, various kinds of thermoplastic resins, thermosetting resins, and photo-curing resins may be used.

The multiple fine particles can take various shapes as mentioned above and different kinds of shapes are selected to control the structures of the carbon nanotube structures. However, it is preferable that a spherical shape is selected because the carbon nanotubes are hard to fix on their surfaces.

It is preferable that the average diameter of the multiple fine particles is within a range of 10 nm to 1000 $\mu$m, more preferable that it is within 20 nm to 100 $\mu$m, and even more preferable that it is within 50 nm to 10 $\mu$m.

If the average diameter of the multiple fine particles is smaller than 10 nm, the repulsion among the carbon nanotubes easily becomes larger than the attraction generated by the liquid bridges formed at the gaps among the multiple fine particles and in some cases, better structures cannot be achieved. Moreover, the effects of the liquid bridges caused by the liquid, which is contained in the carbon nanotubes, cannot be avoided, and the fine particles are prone to fix to the carbon nanotubes.

On the other hand, if the average diameter of the multiple fine particles exceeds 100 $\mu$m, the carbon nanotubes are difficult to be trapped into the multiple liquid bridges and in some cases, they self-aggregate at the liquid bridges because the average diameter of most of the carbon nanotubes is smaller than 100 $\mu$m. Furthermore, in the application fields such as devices, functional materials, and structural materials containing, fine structures with 100 $\mu$m of the average diameter are desired. The structures, of which average diameter is 100 $\mu$m or larger, are not practical.

Liquid

For the liquid forming the liquid bridges, any liquid may be selected with no special limitation provided that the liquid does not solves the multiple object and the carbon nanotubes. In addition, since the carbon nanotubes are insoluble to a organic solvent, any liquid suitable for the multiple objects may be selected. It is preferable that if latex is selected for the multiple objects, water, water solution containing a surface-active agent, water solution containing ions, alcohol, or any mixture of them is used.

It is preferable that the liquid with a moderate surface tension is selected to form better liquid bridges. After the carbon nanotubes has been dispersed in the liquid, the surface tension is preferably selected from a range of 0.0001 mN to 10000 mN and further preferably selected from a range of 0.001 mN to 1000 mN.

It is preferable that the substances, which allow the viscosity of the liquid to be adjusted and the surface energy of the liquid to be adjusted, are added to the liquid forming the liquid bridges.

For water solutions, the substances, which can adjust the viscosity of the liquid, include 1) the substances controlling the flow of the molecules of the solution, such as ethylene glycol with a high affinity to water, 2) the substances controlling the flow of the solution, such as water-soluble polymers or water-soluble molecules, which have been physically or chemically bridged, and 3) the substances, when mixed with particles or fibers, controlling the flow of the solution through the repulsion generated by friction among the particles or fibers.

The substances, which can adjust the surface energy of the water solution, are surface active agents, the substances, metallic-salt and organic solvent such as alcohol, for example.

Modes of a Carbon Nanotube Structures

The carbon nanotubes structured as below can be used as various kinds of carbon nanotube structures in the several modes described below.

1) The carbon nanotubes with the liquid,
2) The carbon nanotubes without the liquid which are evaporated (vanished) and the multiple objects left,
3) Only the carbon nanotube structures without the liquid and the multiple objects,
4) The matrix, which has a framework made of the carbon nanotube structures. This is produced by evaporating the liquid, melting the multiple objects and solidifying them back into the matrix, in which the carbon nanotubes are structurally arranged.

It can be said that in any mode mentioned above, the carbon nanotube structures, which link along the shapes of the liquid bridges formed at the gaps among the multiple objects each other and/or at the gaps among the portions of the object, are structured and arranged into the structures. It may be considered that the shapes of the liquid bridges specifically are the concave shape on the top surfaces of the liquid bridges, in which the carbon nanotubes are arranged.

Each of the modes listed above are described below.

1) The Carbon Nanotubes Containing the Liquid with No Change

Although the carbon nanotubes containing the liquid of the liquid bridges, which met and the were structured at the liquid bridges, are unstable, they may be used as the carbon nanotube structures with no change depending on their applications. In this case, by applying a potential gradient externally, the carbon nanotubes can be electrophoresed. This allows the liquid bridges, at which a large number of carbon nanotubes link or the liquid bridges, at which a small number of carbon nanotubes link to be locally formed, or allows the carbon nanotubes from many directions to link at the specific liquid bridges. At that time, thick main lines and fine branches of the carbon nanotube wiring, which serve as signal transmission paths, as well as the number of branches for signal transmission can be controlled. Furthermore, high-order signal processing can be performed, which cannot be achieved in simple periodic arrangements.

By declining the carbon nanotubes as a whole, an average flow field is generated by gravity and the carbon nanotubes unequally distributed can be rearranged equally. This is the same principle as that for column chromatography. In addition, by repeating this process, the carbon nanotubes with a given length or thickness can be selectively arranged or extracted.

2) The Carbon Nanotubes with the Liquid Evaporated (Evanished) and the Multiple Objects Left The carbon nanotubes, which met and were structured at the liquid bridges, become more solid structures by evaporating the liquid of the liquid bridges fully. In particular, when the multiple fine particles are used as the multiple objects, a solid network of carbon nanotubes is formed. The carbon nanotube structures with the multiple objects left in them can be used. This type of carbon nanotube structures may be used as electric elements, in which the electric characteristics of the carbon nanotubes, with no change. In addition, as mentioned above, by structuring the multiple carbon nanotube structures together with the other objects and arranging them at the gaps among the carbon nanotubes each other and/or in the vicinity of the gaps, the carbon nanotube structures having various characteristics corresponding to those of the other objects to be arranged can be achieved.

Furthermore, the desired function may be added to the multiple objects left in advance.

3) Only the Carbon Nanotube Structures with the Liquid and the Multiple Objects Evaporated (Evanished)

Figure 18:
FIG. 18 is an enlarged electron microscopic picture showing another example of the carbon nanotube structures of the present invention.

The carbon nanotubes, which met and were structured at the liquid bridges, become more solid structures by evaporating the liquid of the liquid bridges. For this reason, for instance, when the multiple fine particles as the multiple objects, by ultrasonic-vibrating the whole structures, the multiple fine particles can be easily separated down from the network of carbon nanotubes. In addition, for example, when the hot melt resin is used as the multiple objects, hot-melting also allows the multiple fine particles to easily separate down. The enlarged electronic microscopic picture of the carbon nanotube structure produced in this way is shown in FIG. 18. In FIG. 18, the carbon nanotubes are seen as a white honeycomb like structure.

Thus, the carbon nanotube structures with the multiple objects removed (evanished) themselves are the solid structures and can be used as electric elements, in which the electric characteristics of the carbon nanotubes are applied, with no change. In addition, as mentioned above, by structuring the multiple carbon nanotube structures together with the other objects and arranging them at the gaps among the carbon nanotubes each other and/or in the vicinity of the gaps, the carbon nanotube structures having various characteristics corresponding to those of the other objects to be arranged can be achieved. Furthermore, using the substance having a bridging function, which bridges among the carbon nanotubes, at least as part of the other objects and by combining the carbon nanotube structures into one structure similar to a molecular structure, high-level of functionality is add as a whole. In addition, the bridging function of the other objects closely engage among the structured and arranged carbon nanotubes to solidify the carbon nanotube structure. This means that the other objects serve as an adhesive among the carbon nanotubes, further strengthening toughness of the carbon nanotube structures with no adhesive.

Since the carbon nanotube structures of this example, which was produced using the multiple fine particles as the multiple objects, are very solid regardless of their hollow structures, they can be used as electric elements, in which the electric characteristics of the carbon nanotubes are applied. In addition, they can be as electrodes because of their conductivity and corrosion resistance, and apart from their electric characteristics, even as various kinds of structural materials (chassis, frames, mechanical parts, etc.) because of their toughness. In this case, their structures are hollow and have low density, which allows the structures to be very lightweight and tough. By pouring other substances into the hollows, the characteristics of the carbon nanotubes can be controlled depending on the substances.

4) The Matrix, which is a Framework for the Carbon Nanotube Structures.

This is produced by evaporating (evanishing) the liquid, melting the multiple objects, and solidifying the back into the matrix, in which the carbon nanotubes are structured and arranged.

When polymeric fine particles especially such as thermoplastic resins are used as the multiple objects, the fine particles are molten by heating and re-solidified in to the matrix. The carbon nanotubes are structured and arranged in the matrix. The matrix with the framework of carbon nanotubes is achieved. As mentioned above, the carbon nanotube structures themselves are very solid and is used as a filler for resins, strengthening the toughness of lump of resin. The matrix bodies with the framework of carbon nanotubes are very tough. Furthermore, when they are molten and solidified, they can be formed into the desired shapes such as films. In this case, since the structured carbon nanotubes maintain their structures, allowing a wide variety of applications, for instance, their dynamic structures to be strengthened and additional layers to be the deposited on the compound devices.

In this example, the carbon nanotube structures can be used not only as electric elements, in which the electric characteristics of the carbon nanotubes are applied but also as electrodes as shown in the example 3) because of their conductivity and corrosion resistance, and apart from their electric characteristics, even as various kinds of structural materials (chassis, frames, mechanical parts, etc.) because of their toughness.

A method for Manufacturing Carbon Nanotube Structures

The carbon nanotube structures of this invention can be manufactured by forming the liquid bridge at the gaps among the multiple objects and/or at the gaps among the multiple portions of the object, at which the carbon nanotubes link to be structured and arranged in to the carbon nanotube structures. This means that at least the carbon nanotube structures are manufactured in the following processes.

1) fine gaps are formed among the multiple objects and/or among the portions of the object,
2) the liquid bridges are formed at the gaps, and
3) the multiple carbon nanotubes gather at the liquid bridges.

In addition, the three fundamental manufacturing processes 1) to 3), by adding 4) the process, in which the other objects are added, 5) the process, in which the liquid of the liquid bridges is further evaporated, and 6) the process, in which the multiple objects are evanished if necessary, the carbon nanotube structures controlled into the desired structures can be manufactured.

The fundamental processes 1) to 3) are not always followed individually and can be used in any combination, for example, 1) and 2), 2) and 3), 1) and 3) at the same time. Giving the concrete examples of the procedure, the carbon nanotube structures of this invention are described.

Example 1 of Production for Manufacturing

Prepare the multiple objects and arrange them at the desired sites to form fine gaps. One object may be formed into fine gaps in any manner [Process 1].

On the other hand, prepare the liquid with the carbon nanotubes dispersed. If the other objects should be mixed together into the carbon nanotube structures, add the objects in the dispersing liquid [Process 4]. At this time, to prevent the carbon nanotubes or the other objects from aggregating, preferably use a rotary stirring machine or an ultrasonic distributor to make the liquid uniform.

Supply the prepared dispersing liquid with the carbon nanotubes and the other objects (if necessary) at the fine gaps formed by the multiple objects. The methods for supplying the dispersing liquid include a method by which the prepared dispersing liquid is directly dropped in the fine gaps formed by the multiple objects and a method in which all the multiple objects with the fine gaps formed are soaked in the prepared dispersing liquid.

Evaporate a certain amount of liquid from the supplied dispersing liquid with the carbon nanotubes and the other objects (if necessary) dispersed to form the liquid bridges of the concentrated liquid at the fine gaps formed by the multiple objects, the multiple carbon nanotubes, at which the carbon nanotubes link [Process 2] and [Process 3].

Example 2 of Production for Manufacturing

Prepare the multiple fine particles as the multiple objects, scatter the fine particles and the carbon nanotubes in the appropriate liquid to prepare the dispersing liquid. If the other objects should be mixed together into the carbon nanotube structures, add the objects in the dispersing liquid [Process 4].

At this time, to prevent the carbon nanotubes or the other objects from aggregating, preferably stir to make the liquid uniform. However, too much stirring causes the carbon nanotubes to fix the multiple fine particles. In particular, when spherical fine particles are used, in some cases, the carbon nanotubes may wind around the multiple fine particles.

Thus, preferably to keep the dispersibility of both the multiple fine particles and carbon nanotubes better, put them individually in separate liquids and use a rotary stirring machine or an ultrasonic distributor to stir them sufficiently. Mix the two liquids to prepare the dispersing liquid with the carbon nanotubes and the multiple fine particles equally dispersed. At this time, if the other objects are added to the liquid, the other objects may be put in the third liquid and mix in the dispersing liquid with the carbon nanotubes and the multiple fine particles, or they may be put in one of or both liquids with the multiple fine particles and the carbon nanotubes dispersed when or after the dispersing liquids are prepared.

Arrange the dispersing liquid with the carbon nanotubes and the multiple fine particles in the given sites. Concretely, apply the dispersing liquid to the given sites or put it into the given container. The methods for applying the dispersing liquid include the conventional well-known spin coat method, the dip coat method, the splaying method, the drop method, the roll coat method, and the wire bar coat method.

By evaporating a certain amount of the liquid with no change, the multiple fine particles precipitate in the dispersing liquid, the fine gaps are formed, at which the liquid bridges of the concentrated liquid are formed, where the carbon nanotubes link [Process 1 to Process 3].

If the specific gravity of the multiple fine particles is larger than that of the carbon nanotubes, it is useful that they are left at rest prior to evaporation. Leaving at rest causes the multiple fine particles, of which specific gravity is larger, to precipitate sooner than the carbon nanotubes, forming the gaps among the multiple fine particles [Process 1]. After that, by evaporating a certain amount of the dispersing liquid, the liquid bridges are formed of the concentrated liquid with the carbon nanotubes and the multiple fine particles dispersed at the fine gaps formed by the multiple fine particles, at which the multiple carbon nanotubes link [Process 2 and Process 3].

In any of the examples described above, it is desired that the carbon nanotubes (and the other objects) are fully dispersed throughout the dispersing liquid, and physical forces such as ultrasonic, pH of the dispersing liquid with the carbon nanotubes and the multiple fine particles dispersed, addition of dispersing agents such as an surface active agent, and temperature are adjusted to enhance the dispersion force as much as possible. Concretely, it is preferable that the conditions are set as follows; ultrasonic releases intertanglement among the carbon nanotubes and the impurities such as amorphous carbon are peeled off from the carbon nanotubes. It is recommended that the output of ultrasonic is set to a higher setting. However, special care should be taken in conditioning because excessive ultrasonic raises the temperature of the dispersing liquid and deteriorates the dispersing agent in it, possibly resulting in an increase of the aggregates of the carbon nanotubes.

The dispersing agents such as a surface-active agent should be set considering the parameters such as CMC (critical micelle concentration) and CAC (critical aggregation concentration), indicating the concentrations, at which the target substances are easily solved. Note that since the commercially available carbon nanotubes vary in length and thickness, in some cases, any condition substantially different from the concentrations is desirable. An attempt to find out the optimal conditions should be made by repeating the inspection under various conditions.

The pH value and ion concentration in the dispersing liquid are factors, which govern an electrical attraction-repulsion balance in the dispersing liquid, have significant effects on the stability of the surface-active agent in the dispersing liquid, the dispersibility of the carbon nanotubes being strongly affected. Moreover, since the carbon nanotubes themselves treated with the solutions such as a strong acid solution are prone to dissolve, although a dispersing agent does not always have to be used, special care should be taken in applying it to find out the optimal conditions because the added functional group would strongly affect the pH value and ion concentration.

To enhance the dispersibility of the carbon nanotubes, the method for increasing the viscosity of them can be used. On the other hand, since, for the carbon nanotubes containing a large amount of impurities, the impurities are also dispersed and it is difficult to remove them, it is preferable that the viscosity is set to a low value. Alternately, by purifying them in advance, the dispersing state can be made stable with high viscosity kept.

It is desirable that for the dispersing liquid with the multiple fine particles (if necessary, any other object) dispersed, the particles are fully dispersed, although it may be so much desirable as for the dispersing liquid with the carbon nanotubes dispersed. The parameters including physical forces such as ultrasonic, a pH value of the solution, addition of dispersing agents such as a surface-active agent, and temperature should be set to gain moderate dispersibility. Concretely, it is preferable that they are kept in the dispersion state called "colloidal" and such a dispersing agent is selected that mixture of it with the dispersing liquid of carbon nanotubes does not break the stable state. To enhance dispersibility, the method for increasing the viscosity of the carbon nanotubes can be selected. However, to mix the carbon nanotubes and the dispersing agent more quickly, the viscosity is preferably set to a lower value.

On the other hand, as mentioned above, it is desired that the multiple fine particles and the carbon nanotubes (in necessary, the other objects) are not so strongly stirred to avoid fixation between the carbon nanotubes and the particles. Concretely, it is preferable that they are stirred using a magnetic stirrer or stirring machine at a constant temperature. It is recommended that an ultrasonic distributor is not used. The use of the ultrasonic distributor or a rise in temperature cause the carbon nanotubes to be prone to stick to the fine particles, possibly resulting in aggregation, in which the carbon nanotubes intertangle with the multiple fine particles.

To structure the other objects as well, it is desirable that the any ultrasonic distributor such as an ultrasonic homonizer is used to pre-release the bundles of the carbon nanotubes in the dispersing liquid with the carbon nanotubes (and if necessary, the other objects) dispersed. This enables the other objects to be trapped into the gaps among the carbon nanotubes in rearranging the carbon nanotubes gathering at the liquid bridges. As in crystallization of molecules, at this time, the other objects are expected to be removed, although by evaporating correctly (more concretely, at a high speed) a certain amount of the liquid of the liquid bridges to remove it, the other objects can be left with being inserted in the gaps among the carbon nanotubes each other. For this reason, it is preferable that an attempt is made to evaporate the liquid at the liquid bridges more quickly to heat the liquid bridges. The preferable heating temperature is within 2 to 95° C. in the case of a water solution being used, and more preferable is within 5 to 80° C.

To accelerate the evaporation rate of the liquid at the liquid bridges, it is possible that fine holes are drilled out in advance to reduce the liquid at a higher rate. At this time, any commercially available filter may be used or electron beam lithography, laser lithography, or electrochemical etching may be used to form fine holes. In addition, by a similar method, it is possible to form channels, through which the liquid is discharged quickly.

Applications of Carbon Nanotube Structures of the Invention

It is expected that the carbon nanotube structures of the invention manufactured in this way may be widely applied in the technological and engineering fields. Concrete applications of them are listed below. Of course, specifically more appropriate applications can be considered depending on the concrete constructions of the carbon nanotube structures.

1) Electronics

As mentioned above, the carbon nanotube structures can be used as electrode, lead wires, electrical wiring, and electronic elements. In addition, as well known, the carbon nanotubes, which have generally very high conductivity, achieve molecular switches, molecular memory, molecular processors and the like by inserting molecules designed for molecular electronics as the other objects into the gaps among the carbon nanotubes. The devices made of the carbon nanotubes of the invention have so many advantages compared with the silicone devices made by the conventional methods in that wiring is not fixed on the board, the carbon nanotubes used in wirings in devices are enough flexible to close and separate them freely, the carbon nanotube wirings are finer than the resolution of lithography, and wiring is achieved by chemically bonding. These advantages allow direct access to small-size molecules with diameters, for example, 5 nm or smaller. For this reason, the use of the carbon nanotube structures of the invention enables large-scale electronic integrated circuits at higher densities to be easily manufactured at low costs.

2) Various Kinds of Structural Units

As mentioned above, the carbon nanotube structures can also be used for various structural units (chassis, frames, and other mechanical parts) because of their toughness. In particular, since the carbon nanotube structures, which are made from the multiple fine particles used as the multiple objects and from which the multiple fine particles have been removed, are lightweight and tough, they are preferably applicable to the structural units with requirements of light-weight and toughness in various fields.

It is generally said that by simply dispersing a filler in resins, high toughness can be achieved, although for the carbon nanotube structures manufactured by structuring and arranging the carbon nanotubes in the matrixes (resin), the carbon nanotubes saving as a filler are formed into solid structures in resin matrixes, achieving very high toughness. For this reason, the carbon nanotube structures of the invention are preferably applicable even to the structural units made of conventional light and stronger metals such as titan.

EXAMPLES

Example 1

By following the processes (Process 1) to (Process 3) described later, the dispersing liquid with objects dispersed, which contains the constituents listed below, is prepared, and the carbon nanotube structures are manufactured using the dispersing liquid.

a) Monolayer carbon nanotube (average length: about 10 μm, average diameter: about 2.5 nm) . . . 0.01 g
b) Water solution with 0.001 mass % of surface-active agent (from Wako Pure Chemical Industries, Ltd., SDS (Sodium Dodecyl Sulfate)) . . . 0.5 g
c) Water solution (colloidal solution) with 3 mass % of latex particles (polysthyrene, average diameter of particle 0.3 μm, spherical) . . . 1.0 g Process 1

By mixing a) into 2.0 g of water solution described in b) and dispersing the carbon nanotubes well using 3W ultrasonic, the dispersing liquid with the carbon nanotubes dispersed is prepared.

Process 2

By mixing and stirring the dispersing liquid with the carbon nanotubes dispersed prepared in (Process 1) and the dispersing liquid (colloidal solution) with 1.0 g of latex particles dispersed, the dispersing liquid with the carbon nanotubes and latex particles dispersed is prepared. The resulting dispersing liquid has 75 mN/m of surface tension.

Process 3

Using a spin-coater (rotary film-forming apparatus), the resulting dispersing liquid prepared in (Process 2) is grown on one side of a mica board.

At this time, by adjusting the number of rotations of the spin-coater, excessive dispersing liquid can be removed from the mica board. At the liquid bridges formed at the gaps between a single latex layer and the latex particles arranged on the mica board, the carbon nanotubes link together and are formed into structures.

Example 2

By following the processes (Process 1) to (Process 3) described later, the dispersing liquid with objects dispersed, which contains the constituents listed below, is prepared, and the carbon nanotube structures are manufactured using the dispersing liquid.

a) Monolayer carbon nanotube (average length: about 10 μm, average diameter: about 2.5 nm) . . . 0.01 g
b) Water solution with 0.001 mass % of surface-active agent (from Wako Pure Chemical Industries, Ltd., SDS (Sodium Dodecyl Sulfate)) . . . 2.0 g
c) Water solution (colloidal solution) with 3 mass % of latex particles (polysthyrene, average diameter of particle 0.3 μm, spherical) . . . 1.0 g Process 1

By mixing a) into 0.50 g of water solution described in b) and dispersing the carbon nanotubes well using 3W ultrasonic, the dispersing liquid with the carbon nanotubes dispersed is prepared.

Process 2

By mixing and stirring the dispersing liquid with the carbon nanotubes dispersed prepared in (Process 1) and the solution (colloidal solution) with 1.0 g of latex particles dispersed prepared in c), the dispersing liquid with the carbon nanotubes and latex particles dispersed is prepared. The resulting dispersing liquid has 80 mN/m of surface tension.

Process 3

Using a spin-coater (rotary film-former), the resulting dispersing liquid prepared in (Process 2) is grown on one side of a mica board.

At this time, by adjusting the number of rotations of the spin-coater, the excessive dispersing liquid can be removed from the mica board. As in Example 1, at the liquid bridges formed at the gaps between a single latex layer and the latex particles arranged on the mica board, the carbon nanotubes link together and are formed into structures. Note that the resulting carbon nanotube structures have lager thickness than those of Example 1.

Example 3

By following the processes (Process 1) to (Process 3) described later, the dispersing liquid with objects dispersed, which contains the constituents listed below, is prepared, and the carbon nanotube structures are manufactured using the dispersing liquid.

a) Monolayer carbon nanotube (average length: about 10 $\mu$m, average diameter: about 2.5 nm) . . . 0.01 g
b) Water solution with 0.001 mass % of surface-active agent (from Wako Pure Chemical Industries, Ltd., SDS (Sodium Dodecyl Sulfate)) . . . 2.0 g
c) Water solution (colloidal solution) with 3 mass % of latex particles (polyethylene, average diameter of particle 0.3 $\mu$m, spherical) . . . 1.0 g Process 1
By mixing a) into 2.0 g of water solution described in b) and dispersing the carbon nanotubes well using 3W ultrasonic, the dispersing liquid with the carbon nanotubes dispersed is prepared.
Process 2
By mixing and stirring the dispersing liquid with the carbon nanotubes dispersed prepared in (Process 1) and the solution (colloidal solution) with 1.0 g of latex particles dispersed, the dispersing liquid with the carbon nanotubes and latex particles dispersed is prepared. The resulting dispersing liquid had Pa.s of surface tension.
Process 3
Using the dip coating method (pull-up method), the resulting dispersing liquid prepared in (Process 2) is grown on one side of a mica board. As in Example 1, at the liquid bridges formed at the gaps between a single latex layer and the latex particles arranged on the mica board, the carbon nanotubes link together and are formed into structures.

Example 4

In (Process 3) of Example 3, except that a spray gun is used instead of the dip coating method (pull-up method), the resulting dispersing liquid prepared in (Process 2) is grown on one side of a mica board in the same manner as that of Example 3. As in Example 3, at the liquid bridges formed at the gaps between a single latex layer and the latex particles arranged on the mica board, the carbon nanotubes link together and are formed into structures.

Example 5

In (Process 3) of Example 3, except that the mixture prepared in (Process 2) is dropped on the mica board to naturally dry it instead of the dip coating method (pull-up method), the resulting liquid prepared in (Process 2) is grown on one side of a mica board in the same manner as that of Example 3. As in Example 3, at the liquid bridges formed at the gaps between a single latex layer and the latex particles arranged on the mica board, the carbon nanotubes link together and are formed into structures.

As mentioned above, according to the invention, the carbon nanotube structures can be manufactured, which enhances handling of the carbon nanotubes, enabling them to be applied in a wide range of fields such as electronic devices, functional materials, and structural materials containing carbon nanotubes, and the method for producing them can be provided.

The entire disclosure of Japanese Patent Application No. 2001-59055 filed on Mar. 2, 2001 including specification, claims, drawings and abstract is incorporated herein by reference in its entirety.

What is claimed is:

1. A method for manufacturing carbon nanotube structures comprising, forming liquid bridges of a liquid at gaps among plural objects and/or at plural gaps among portions of an object, wherein plural carbon nanotubes are dispersed in the liquid and linked together to be structurally arranged.

2. The method for manufacturing carbon nanotube structures according to claim 1, wherein the plural objects are plural fine materials.

3. The method for manufacturing carbon nanotube structures according to claim 2, wherein the lengths of the plural carbon nanotubes are longer than an average sphere equivalent diameter of the plural fine materials.

4. The method for manufacturing carbon nanotube structures according to claim 2, wherein the average sphere equivalent diameter of the plural fine materials is 10 nm or larger and 1000 $\mu$m or smaller.

5. The method for manufacturing carbon nanotube structures according to claim 2, wherein the plural fine materials are plural polymeric fine particles.

6. The method for manufacturing carbon nanotube structures according to claim 2, wherein the plural fine materials are arranged with gaps among each other to form liquid bridges, allowing the plural carbon nanotubes to link together by evaporating only a certain amount of the liquid with the plural fine materials and the plural carbon nanotubes dispersed in it.

7. The method for manufacturing carbon nanotube structures according to claim 6, wherein, by further evaporating only the liquid after the liquid bridges have been formed, the plural carbon nanotubes can link at the liquid bridges and the gaps among the plural fine materials are narrowed.

8. The method for manufacturing carbon nanotube structures according to claim 7, wherein by narrowing the gaps among the plural fine materials, the plural fine materials can be arranged at the highest density.

9. The method for manufacturing carbon nanotube structures according to claim 6, wherein by adjusting a density of the carbon nanotubes in the liquid forming the liquid bridges, the amount of the carbon nanotubes to link at the liquid bridges can be controlled.

10. The method for manufacturing carbon nanotube structures according to claim 6, wherein only the liquid forming the liquid bridges is fully evaporated, the plural fine materials are dissolved and then solidified back into matrixes, in which the carbon nanotubes are structured and arranged to achieve solidification of the carbon nanotubes as structures.

11. The method for manufacturing carbon nanotube structures according to claim 1, wherein only the liquid forming the liquid bridges is fully evaporated.

12. The method for manufacturing carbon nanotube structures according to claim 11, wherein the carbon nanotube structures, which are formed and arranged into the structures with hollows, are obtained by resolving the plural objects.

13. The method for manufacturing carbon nanotube structures according to claim 1, wherein lengths of the plural carbon nanotubes are longer than the shortest one among widths of the gaps at individual portions of the plural objects.

14. The method for manufacturing carbon nanotube structures according to claim 1, wherein when the plural carbon nanotubes link at the liquid bridges, different kind of objects are intervened and the carbon nanotubes are structured and arranged in conjunction with the different kind of objects.

15. The method for manufacturing carbon nanotube structures according to claim 14, wherein when the plural carbon nanotubes are structured and arranged, at least some of the different kind of objects are arranged at gaps among the carbon nanotubes.

16. The method for manufacturing carbon nanotube structures according to claim 15, wherein at least some of the different kind of objects have a bridging function, which bridges between the carbon nanotubes one another.

17. The method for manufacturing the carbon nanotube structures according to claim 16, wherein, with use of the bridging function of the different kind of objects, the structured and arranged carbon nanotubes are closely engaged to solidify as structures.

* * * * *